United States Patent
Valgardsson et al.

(10) Patent No.: US 10,503,964 B1
(45) Date of Patent: Dec. 10, 2019

(54) METHOD AND SYSTEM FOR MEASURING AND VISUALIZING USER BEHAVIOR IN VIRTUAL REALITY AND AUGMENTED REALITY

(71) Applicant: ALDIN DYNAMICS, EHF., Reykjavik (IS)

(72) Inventors: Gunnar Steinn Valgardsson, Reykjavik (IS); Hrafn Thorri Thorisson, Reykjavik (IS); Pall Arinbjarnar, Hafnarfjordur (IS)

(73) Assignee: ALDIN DYNAMICS, EHF., Reykjavik (IS)

( * ) Notice: Subject to any disclaimer, the term of this patent is extended or adjusted under 35 U.S.C. 154(b) by 66 days.

(21) Appl. No.: 15/894,104

(22) Filed: Feb. 12, 2018

Related U.S. Application Data

(60) Provisional application No. 62/457,331, filed on Feb. 10, 2017.

(51) Int. Cl.
| | |
|---|---|
| *G06K 9/00* | (2006.01) |
| *G06T 11/60* | (2006.01) |
| *G06T 19/00* | (2011.01) |
| *G06F 16/26* | (2019.01) |
| *G06F 16/2457* | (2019.01) |
| *G06T 13/40* | (2011.01) |
| *G06T 11/20* | (2006.01) |

(52) U.S. Cl.
CPC ... *G06K 9/00335* (2013.01); *G06F 16/24575* (2019.01); *G06F 16/26* (2019.01); *G06T 11/60* (2013.01); *G06T 19/006* (2013.01); *G06T 11/206* (2013.01); *G06T 13/40* (2013.01); *G06T 2200/24* (2013.01)

(58) Field of Classification Search
None
See application file for complete search history.

(56) References Cited

U.S. PATENT DOCUMENTS

2018/0165984 A1* 6/2018 Waldron ............... G09B 19/00

\* cited by examiner

*Primary Examiner* — Vu Nguyen
(74) *Attorney, Agent, or Firm* — Lando & Anastasi, LLP

(57) ABSTRACT

According to one aspect of the disclosure, a method of analyzing users in a Virtual Reality (VR) or Augmented Reality (AR) environment is provided. The method includes acts of receiving a data stream including information indicative of one or more user actions performed by a user in a simulated environment, analyzing the data stream to determine whether a first condition is satisfied, capturing, responsive to determining that the first condition is satisfied, first user behavior data including at least a portion of the information indicative of the one or more user actions, receiving a request for user behavior data satisfying the first criterion, extracting, from the user behavior data, a plurality of user behavior data segments, transmitting, responsive to receiving the request, the plurality of user behavior data segments, and displaying a visualization of the plurality of user behavior data segments.

20 Claims, 28 Drawing Sheets

Session Timelines

Behavior Data segments are extracted from a session as an event occurs, allowing collection of event A in the above example. These segments are then ready for targeted review with a viewer application, each segment showing a single user experiencing event A regardless of when it occurred, or a single user experiencing the same event multiple times.

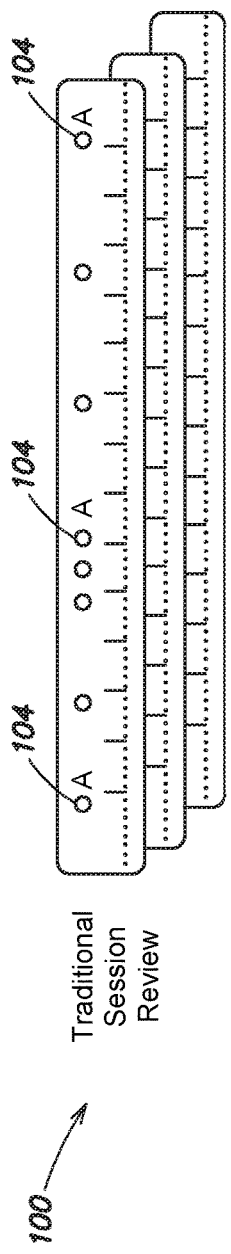
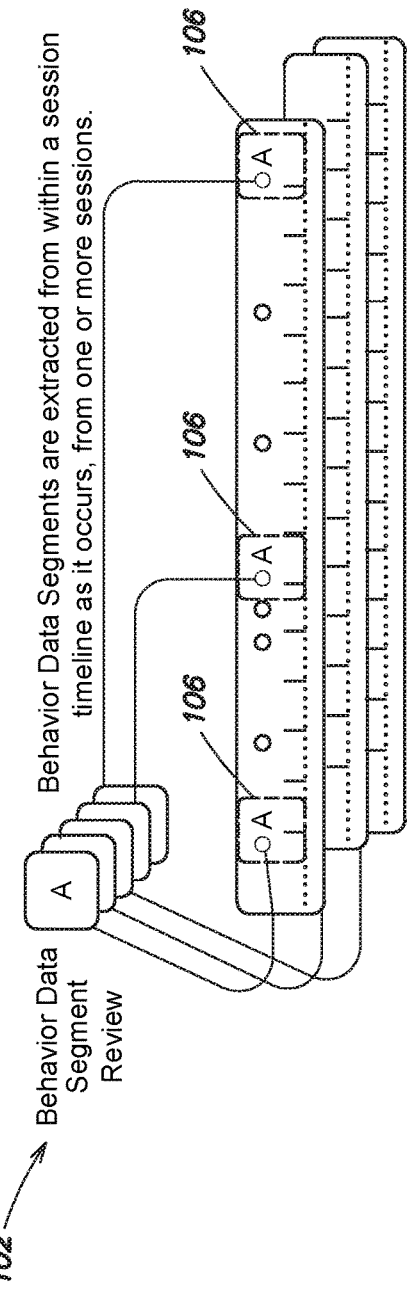

METHOD AND SYSTEM FOR MEASURING AND VISUALIZING USER BEHAVIOR IN VIRTUAL REALITY AND AUGMENTED REALITY

CROSS-REFERENCE TO RELATED APPLICATION

This application claims priority under 35 U.S.C. § 119(e) to U.S. Provisional Application Ser. No. 62/457,331, titled "METHOD AND SYSTEM FOR MEASURING AND VISUALIZING USER BEHAVIOR IN VIRTUAL REALITY AND AUGMENTED REALITY," filed on Feb. 10, 2017, which is hereby incorporated by reference in its entirety.

BACKGROUND OF DISCLOSURE

1. Field of Invention

The present invention relates generally to systems and methods for visualizing user behavior in Virtual Reality (VR) and Augmented Reality (AR) environments.

2. Discussion of Related Art

The advent of VR and AR is introducing new design challenges and complexities in the development of software and virtual worlds. New VR/AR hardware technologies are making radical advancements every year. Users are now physically immersed inside simulated virtual worlds, able to use their physical head to look in any direction, walk around physically, and employ natural interactions using their own hands, as they do in the real world.

SUMMARY OF INVENTION

At least one aspect of the disclosure is directed to a method of analyzing users in a Virtual Reality (VR) or Augmented Reality (AR) environment. The method includes acts of receiving a data stream including information indicative of one or more user actions performed by a user in a simulated environment, analyzing the data stream to determine whether a first condition is satisfied, capturing, responsive to determining that the first condition is satisfied, first user behavior data including at least a portion of the information indicative of the one or more user actions, receiving a request for user behavior data satisfying the first criterion, extracting, from the user behavior data, a plurality of user behavior data segments, transmitting, responsive to receiving the request, the plurality of user behavior data segments, and displaying a visualization of the plurality of user behavior data segments.

In one embodiment, the method further includes filtering the plurality of user behavior data segments based on one or more of physical characteristics, physical behavior, emotional characteristics, and VR or AR hardware characteristics. In some embodiments, the physical characteristics include at least one of body language, gestures, height, stature, reach, and handedness. In an embodiment, the emotional characteristics are determined based on user body language.

In some embodiments, the emotional characteristics include at least one of excitement, boredom, agitation, fright, happiness, sadness, anger, fear, surprise, and disgust. In one embodiment, the physical behavior is indicative of actions by users or physical movement of users. In at least one embodiment, the physical behavior of users is determined based on one or more of a user activity level, a button selection frequency, and an environment interaction frequency.

In some embodiments, each user behavior data segment of the plurality of user behavior data segments corresponds to a respective user of a plurality of users, and wherein displaying the visualization of the plurality of user behavior data segments includes concurrently displaying a respective visualization of physical movement of all or a subset of the plurality of users. In at least one embodiment, each behavior data segment of the plurality of behavior data segments includes at least one label indicative of a property of an object in the behavior data segment. In one embodiment, the property of the object includes at least one of a timestamped position and a timestamped orientation of the object.

According to one embodiment, a system for analyzing users in a Virtual Reality (VR) or Augmented Reality (AR) environment is provided. The system includes a first computing device and a second computing device. The first computing device is configured to receive a data stream including information indicative of one or more user actions performed by a user in the simulated environment, analyze the data stream to determine whether a first condition is satisfied, capture, responsive to determining that the first condition is satisfied, first user behavior data including at least a portion of the information indicative of the one or more user actions, receive a request for user behavior data satisfying the first criterion, extract a plurality of user behavior data segments from the user behavior data, and transmit, responsive to receiving the request, the plurality of user behavior data segments including the first user behavior data. The second computing device is configured to receive the plurality of user behavior data segments, and display a visualization of the plurality of user behavior data segments.

In some embodiments, the second computing device is further configured to filter the plurality of user behavior data segments based on one or more of physical characteristics, physical behavior, emotional characteristics, and VR or AR hardware characteristics. In at least one embodiment, the physical characteristics include at least one of body language, gestures, height, stature, reach, and handedness. In an embodiment, the emotional characteristics are determined based on user body language. In some embodiments, the emotional characteristics include at least one of excitement, boredom, agitation, fright, happiness, sadness, anger, fear, surprise, and disgust.

In at least one embodiment, the physical behavior is indicative of actions by users or physical movement of users. In some embodiments, the physical behavior of users is determined based on one or more of a user activity level, a button selection frequency, and an environment interaction frequency. In at least one embodiment, each user behavior data segment of the plurality of user behavior data segments corresponds to a respective user of a plurality of users, and wherein displaying the visualization of the plurality of user behavior data segments includes concurrently displaying a respective visualization of physical movement of all or a subset of the plurality of users. In one embodiment, each behavior data segment of the plurality of behavior data segments includes at least one label indicative of a property of an object in the behavior data segment.

According to one aspect, a non-transitory computer-readable medium storing sequences of computer-executable instructions for analyzing users in a Virtual Reality (VR) or Augmented Reality (AR) environment is provided. The sequences of computer-executable instructions include instructions that instruct at least one processor to receive a data stream including information indicative of one or more user actions performed by a user in the simulated environment, analyze the data stream to determine whether a first condition is satisfied, capture, responsive to determining that the first condition is satisfied, first user behavior data including at least a portion of the information indicative of the one or more user actions, receive a request for user behavior data satisfying the first criterion, extract a plurality of user behavior data segments from the user behavior data, and transmit, responsive to receiving the request, the plurality of user behavior data segments including the first user behavior data.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1A illustrates a conventional session review display;

FIG. 1B illustrates a Behavior Data Segment review according to an embodiment;

DETAILED DESCRIPTION

Figure 2:
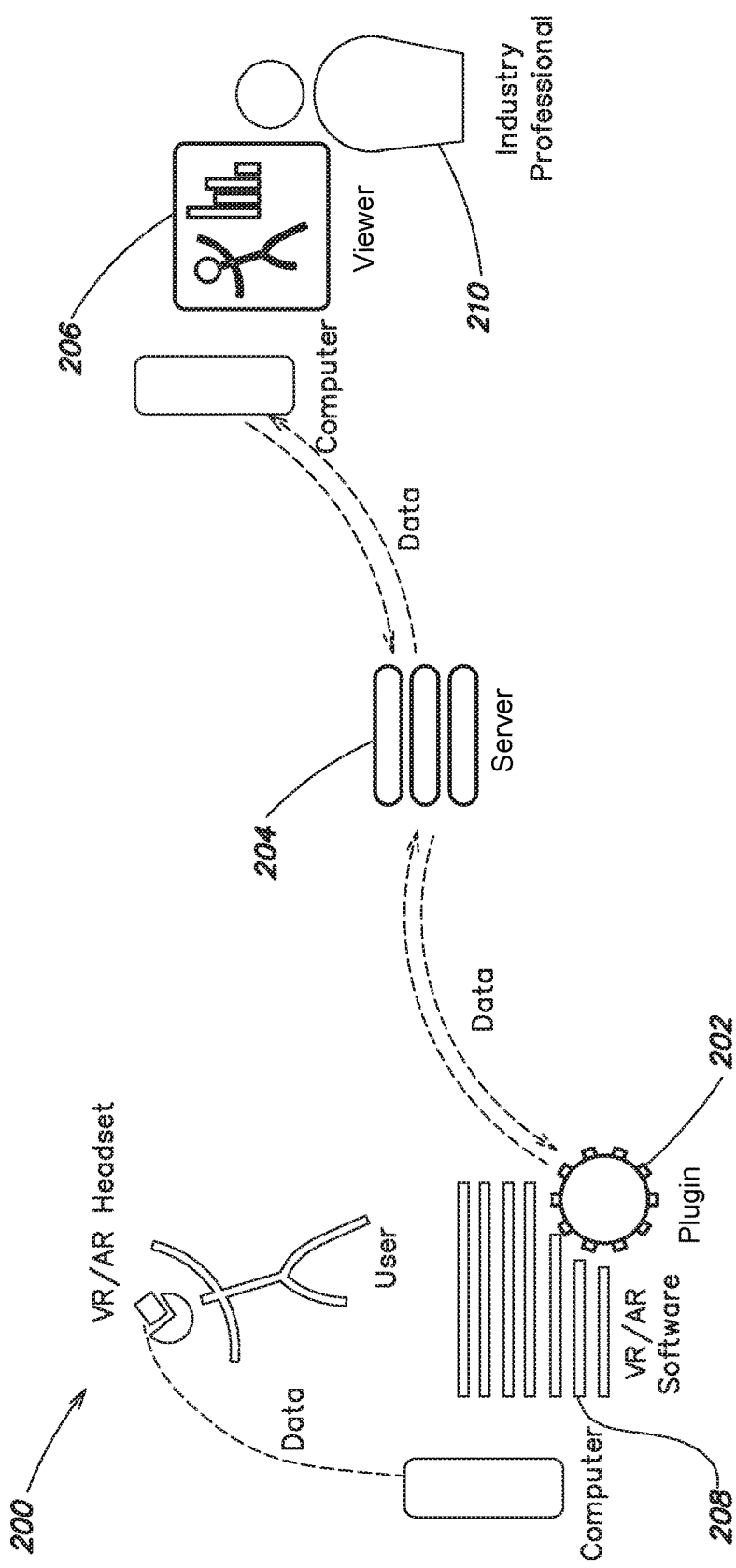
FIG. 2 illustrates an exemplary system according to an embodiment.

Aspects and examples are directed to visualizing user behavior in VR and AR environments. Examples may be directed to systems that allow designers of VR and AR environments to visualize and analyze user behavior in the VR or AR environments, which may advantageously provide insight into users' experiences with the VR or AR environments.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The following terms may be used herein as follows in connection with certain examples.

VR: Virtual Reality.

AR: Augmented Reality.

User: A User of VR/AR software and hardware, where a head-mounted display and/or body-tracking technologies enable the User to physically move around and interact naturally with elements of a simulated virtual world.

User Session: The time during which a User is actively using VR/AR hardware and software.

Behavior Data: Data that represents aspects of the User's physical behavior and/or elements of the virtual and physical environment. This may include positional and/or orientational tracking data (in time and space) representing the User's head movements, and can also include tracking of additional body parts such as hands, eye movement, feet and torso. This may be based on motion-tracking input data collected from VR/AR headsets and hardware accessories (such as motion controllers or gloves) or computer vision techniques that calculate the locations and movements of body parts based on raw image data or depth-sensor data. While the examples given herein describe the use of handheld controllers, gloves, or the like, it will be appreciated that the presently-described embodiments can be performed with the position, orientation, and movement of the hands being tracked by the use of cameras or other imaging sensors, such as those provided with the Microsoft Hololens. Behavior Data may also contain other types of physically expressive human input, such as audio retrieved from the microphone of VR/AR headsets or eye-tracking data, brainwave measurements, heart rate and other types of data that represent physical body expressions, traits and activity.

Behavior Data Segment: A segment of Behavior Data relating to a particular Scene, event, or moment in time. Behavior Data Segments are subsets of the Behavior Data generated throughout a full User session.

Industry Professional: A customer or user of at least one of the methods and/or systems described herein.

Scene: A specific area or time period in VR/AR content, defined by a developer or industry professional to be able to study metrics relating to those areas or points in time in user sessions. A scene could comprise, for example, a game level; a time within a level, such as the last 5 minutes of a level that is 10 minutes in length; or any other spatial, temporal, or conceptual portion of content.

As discussed above, emerging VR/AR technologies are rapidly allowing users enhanced freedom. This newfound User freedom to move and interact naturally makes design of interactive VR/AR software more complex and the process of developing software more challenging. In addition to this, the landscape of VR/AR hardware is diverse and fragmented which makes the design process even more complicated, and may require the design of VR/AR software to suit a broad range of system capabilities.

These new challenges and complexities make quality assurance, User testing, and User observations advantageous to ensure that Users are having a good experience and the software is performing optimally. In some conventional systems, evaluating VR/AR software includes manually observing User tests, where Users play within VR/AR while being visually observed by development teams to identify design issues and bugs. Often this is accompanied by video recordings of Users for later study, and/or with screen-capture software that captures what the User sees inside the virtual world. Manual observation, with or without video capture or screen recording, is a time-consuming and inefficient method of analyzing User behavior in virtual worlds. Conventional quality assurance tools and software analytics solutions are not designed to process and handle these new types of VR/AR hardware, behavior input data and software designs.

For the foregoing reasons, it may be advantageous to provide tools and methods to analyze User behavior, help compare multiple User experiences, and benchmark software performance on different VR/AR hardware systems. The present disclosure addresses how to quantify, measure, visualize and filter new forms of User Behavior Data from VR/AR hardware. When Users are able to naturally interact with a virtual world using their physical bodies, and physically move by taking steps, their behavior becomes as complex and diverse as in real life.

The levels of complexity and differences in User behavior rise exponentially as VR/AR content contains ever more elements (such as objects, events, sounds, etc.), and VR/AR hardware includes a growing number of peripherals and differences in capabilities. This means that developers must keep many factors in mind, at all times, in order to make their VR/AR designs the most usable/effective to their Users. The current methods of evaluating the effectiveness their designs are based on rough feedback, educated guessing, or tedious one-to-one User testing such as video- or screen-recording, all of which are extremely time-consuming and give inconclusive results.

Conventional analytics solutions do not offer visualization of the new forms of VR/AR Behavior Data, nor offer visualization metrics relating to VR/AR setup. Qualitative evaluation through visual observation of User behavior may be advantageous in VR/AR to address the design complexities involved, but visual observation of full User Sessions does not scale, nor do video recordings of User sessions. The time and effort involved in comparing multiple Users may be considerable, especially in the comparison of dynamic events that do not all occur on a linear timeline that is the same for all Users.

The methods and systems described herein allow improved comparisons of how Users physically interact with VR/AR content and allow comparisons of how Users of different physique (e.g. height, stature, left/right handedness) experience the VR/AR content, and how Users attempt to physically interact with VR/AR content. The solution introduces new metrics and quantification techniques derived at least in part from the physical movements of Users while using VR/AR. Additional improvements to methods for visualizing Behavior Data as animated 3D objects representing User movements are also provided, achieved at least in part with a system for visual comparison of User behavior and offering more efficient objective evaluation of VR/AR User experiences.

Systems and methods may also be provided for filtering Behavior Data based at least on metrics for User physique, User movement, VR/AR system and hardware/software setup, geographical location, computing device and hardware specifications. For example, filtering the Behavior Data may be executed in connection with a viewer application with an intuitive graphical user interface that enables Industry Professionals to visually set search parameters to organize data and perform custom queries.

The disclosed systems and methods may be implemented, for example, as a software plugin that is integrated into VR/AR software content to enable collection of Behavior Data and generation of metrics describing User behavior. The systems and methods may generate general metrics from the movement of Users while they are using VR/AR to describe their physical behavior. Additionally, high-fidelity Behavior Data Segments may be captured at pre-defined places in content which can then be visualized as animated 3D objects that represent User movements. The data in these Behavior Data Segments can also be used to generate more advanced statistics for specific User behavior. The position and movements of the User, along with positions, movement and other data for elements in the virtual and physical environment of the User may also be tracked and stored.

The capture of targeted segments of high fidelity Behavior Data may be associated with a particular event in the software or behavior of the User, so that an Industry Professional can save and view targeted visualizations of multiple Users experiencing the same or similar events. By targeting Behavior Data collection with particular events and moments in time and space, the illustrated approach presents a number of advantages over full session data recording. For example, embodiments may (a) be more efficient and targeted, focusing data collection, data processing and subsequent review of targeted events in the User session, (b) enable a more targeted review of the User experience and (c) enables visual comparisons of how multiple Users behave during the same events or moments in time, quickly and effectively.

Extracting specific events or moments in time from the User's timeline means that the User can be easily compared between different Users, regardless of when or how the events occurred. Accordingly, embodiments are applicable to any type of content—whether that content has events that occur in a linear fashion, or events that happen in a dynamically at different points in the session timeline of Users.

For example, FIGS. 1A and 1B illustrate a traditional session review 100 and a Behavior Data Segment review 102, respectively. As illustrated by the traditional segment review 100, events 104 may occur dynamically, requiring an industry professional to review the entire session to identify all events of type A and compare to other sessions. Conversely, as illustrated by the Behavior Data Segment review 102 of the presently-claimed embodiments, Behavior Data Segments are extracted from a session as events occur, allowing collection of events A 106, for example, which enables a targeted review of the events A 106.

Industry Professionals may define conditions in their own software content that, when met, may trigger a submission of a targeted segment of Behavior Data to a server where the Behavior Data is processed to generate metrics describing User behavior. This data may then be retrieved by a viewer application that visualizes data in the form of graphs, diagrams and animated 3D visualizations of User movement and virtual environments.

As discussed above with respect to FIG. 1A, conventional approaches collect data from full User sessions, in some cases showing specific events and actions that Users perform visually marked on a timeline to help summarize sessions. This makes studying sessions easier than manual observation or video recordings, but still carries some of the same disadvantages: going through full session recordings is time consuming and untargeted.

Conventional approaches do not enable collection of Behavior Data Segments, the ability to define the Behavior Data Segments' capture in code, or the ability to visualize the Behavior Data Segments. Conventional session visualizers do not offer methods to view and compare multiple users in a row experiencing the same event, nor any intuitive or automated method to quickly find a particular event in a single user session timeline.

Conventional approaches do not offer methods to visualize VR setup data in Behavior Data such as user play area size, locations of VR sensors for positional tracking or audio levels for the ears of the user. Current approaches do not offer methods to filter Behavior Data or Behavior Data Segment visualizations based on VR setup and/or behavior metrics such as activity level or physical behavior.

Conventional approaches do not offer methods to segment VR/AR software into scenes for the purposes of comparing and benchmarking physical user behavior (movement, interaction, gaze). Conventional approaches do not offer lists of Behavior Data Segments that can be sorted by physical behavior metrics such as user activity level, or VR/AR setup and performance information such as play area size or hardware tracking loss.

Conventional approaches do not offer the option of choosing the manner in which a user is visualized, for example, by selecting VR headset and motion controllers versus an approximation of human head and hands. Conventional approaches do not offer graphs or visualizations of VR/AR specific metrics such as play area size, user height or statistical comparison of physical user movement and behavior.

As discussed above, collecting behavior data for full user sessions may be considered disadvantageous in that a viewer is required to view a single User session at a time, and then manually compare the User session to full recordings for other Users, similar to comparing multiple video recordings of multiple User sessions. With this approach it may be challenging to compare how multiple Users behave when experiencing the same event; a viewer needs to load a new User session, then find the right event for each User and event for comparison. For multiple Users and multiple events that can each potentially happen dynamically on the session timeline, which is extremely time consuming and leads to a less practical workflow. Additionally, the collection of entire User sessions takes significant network bandwidth, storage space and CPU power to process once the data has been collected to a server.

With regards to visualization of the virtual environment in which Users are inhabiting, conventional approaches only work with 3D models representing the virtual world. This requires content creators to export 3D models and textures from their content, manually simplify and fine-tune the exported content in a 3D modelling program such as Blender3D, then upload the simplified and fine-tuned content to web servers. A viewer may then visualize Users within that 3D environment.

Systems and methods described herein allow contextual data to be uploaded in the form of time-series positional data and text labels that represent relevant elements in the virtual environment, instead of using the actual models and textures from the content which is being analyzed. In such embodiments, this eliminates the need to upload 3D models and assets in order for the systems and methods described herein to offer contextual information about the virtual world. Such contextual data may also represent elements in the physical world (real world), so that in the case of augmented reality a label may represent furniture or walls in the physical environment of the user in addition to any virtual elements that may be presented by the AR software in use.

A major problem in current VR/AR content productions is that testing new software is based on rough feedback and educated guesses regarding how designs affect Users. Rather than looking at content on screens, Users are now inside the content itself and interacting naturally using their physical bodies. This dramatically alters the way Users behave and interact with software and developers are therefore investing tremendous time and resources on prototyping new designs to better fit the medium. Once a product is deployed, Industry Professionals currently have no specialized tools to monitor how their products perform post-deployment.

Systems and methods described herein provide a targeted way to measure, analyze and evaluate the User experience when using VR/AR content. For example, the systems and methods may include one or more of software and methods to collect, process and visualize the User experience while using VR/AR. The system and methods allow analysis of User Behavior Data and visualization of physical User behavior, making objective evaluation of User behavior more targeted while offering unique metrics aggregated from Behavior Data. Furthermore, viewers may browse, organize and compare large sets of Behavior Data from multiple Users.

The systems and methods may be applicable to (a) measuring and evaluating prototype functionality, (b) quality assurance to help identify issues, and (b) post-deployment to measure how a large number of Users are behaving and interacting with deployed software in real-world settings.

Disclosed systems and methods allow more targeted review of the User experience, enabling Industry Professionals to study the User experience in detail. For example, such systems and methods may include:

(1) Collecting Behavior Data and Behavior Data Segments from VR/AR hardware and software while Users are inside a virtual world. This may include input data from peripherals like motion controllers and, optionally, other VR/AR input data relating to physical User behavior and the virtual world;

(2) Processing data to generate new metrics and aggregate data that describes User behavior and VR/AR system setup;

(3) Visualizing Behavior Data Segments in the form of animated 3D objects representing User Behavior Data while using VR/AR;

(4) Visualization of new types of graphs and diagrams to illustrate metrics relating to Behavior Data; and (5) Filtering and browsing of Behavior Data based on factors unique to VR/AR.

Accordingly, methods and systems enable collection, processing, and visualization of the specific events, actions and behaviors of multiple Users that Industry Professionals want to study in further detail. The methods and systems allow collection and comparison of data relating to User behavior, without having to view entire User sessions. The system enables filtering of aggregate Behavior Data describing multiple User sessions with metrics that are unique to VR/AR.

Behavior Data and metrics can be viewed and browsed at any time through visualization software and may be studied by Industry Professionals. Industry Professionals may include, for example, content creators, developers, production teams seeking an understanding of how Users experience their content, or marketing teams that want to study broader market trends.

FIG. 2 illustrates an exemplary system 200 according to an embodiment. The system 200 includes a software plugin 202, a server 204, and a viewer application 206. The software plugin 202 (SDK) may be integrated into a customer's VR/AR software application 208. The software plugin 202 automatically collects data and enables customers to define custom data to be collected.

The server 204 (1) receives data transmitted by the software plugin 202, storing the data in a database for further processing, (2) contains instructions that enable processing the transmitted data, enriching the data with detailed information, and mass aggregation of multiple Users' data, and (3) receives requests and queries from the viewer application 206 and returns relevant data. The viewer application 206 retrieves data from the server 204 and visualizes the data in the form of animated representations of physical movements of Users in addition to graphs and diagrams, and allows Industry Professionals to filter and browse the data.

The software plugin 202 can be integrated into any VR/AR software that targets PC, console or mobile hardware platforms that function with VR/AR hardware and accessories. Alternatively, the software plugin 202 can be integrated into a custom built software project or a software project built with a game engine such as Unity3D or Unreal Engine. Embodiments described herein may be particularly advantageous when executed in connection with VR/AR software created using game engines.

In an example scenario, an Industry Professional 210 has created a PC software application for a virtual reality headset using a game engine. The Industry Professional 210 integrates the software plugin 202 to a software project, with the option of defining places to capture specific VR/AR Behavior Data, enabling the Industry Professional 210 to collect data to the server 204 from the Users of software through an internet connection.

The Industry Professional 210 can then launch the viewer application 206 that retrieves statistics and Behavior Data from the server 204, visualizing the statistics and Behavior Data in the form of graphs and visual animations representing User behavior and movements. The Industry Professional 210 may then filter this User data to highlight and review specific subsets of Users based on their physique, behavior and VR/AR system setup. Specific use-cases follow.

Consider a situation in which a Game Designer wants to objectively evaluate whether Users closely examine a designed environment in a specific room in the virtual reality content that the Game Designer has designed. The Game Designer may add a line of code that specifies that high fidelity Behavior Data should be recorded when a User has entered that room.

Figure 3:
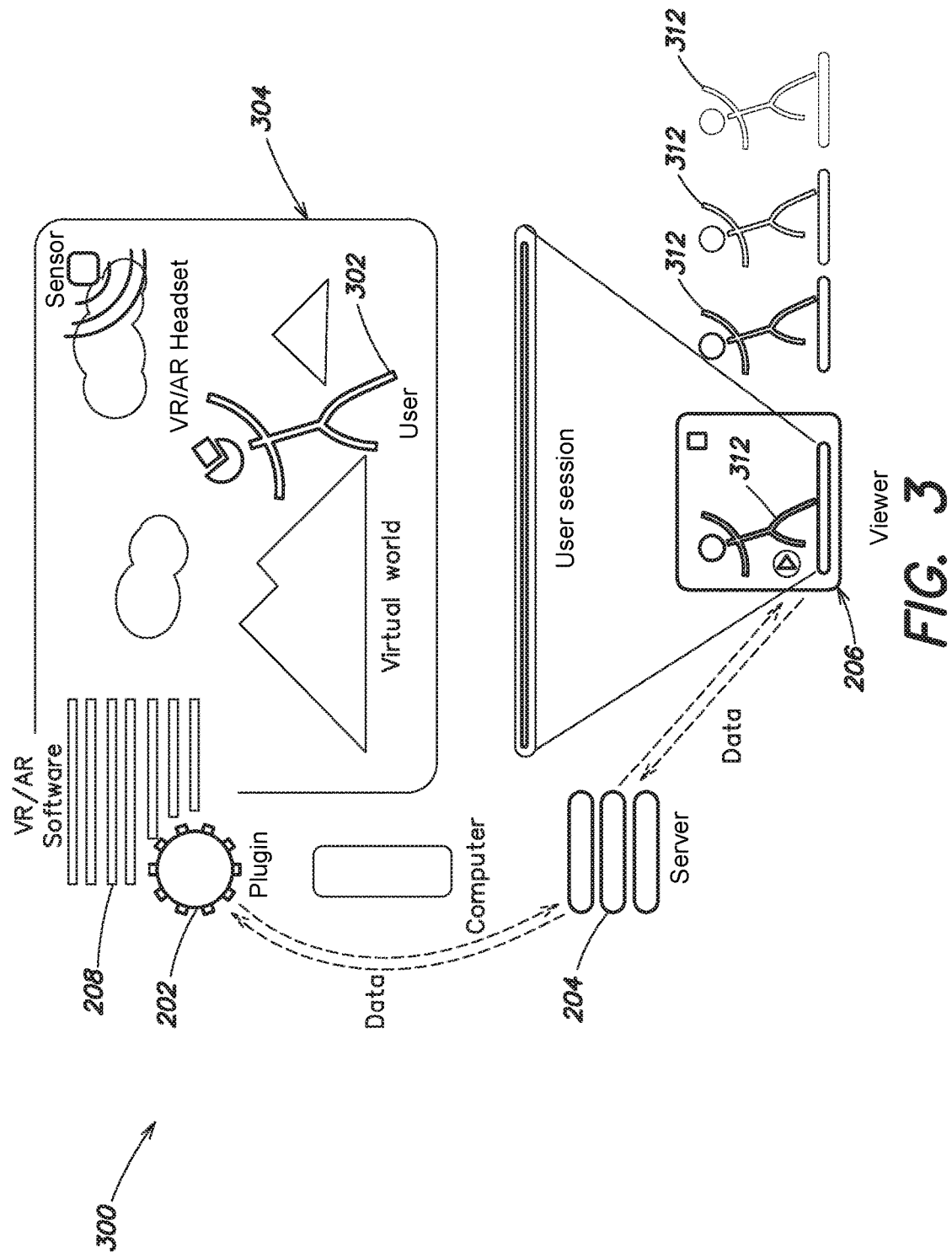
FIG. 3 illustrates a schematic diagram of a viewing session according to an embodiment.

FIG. 3 illustrates a schematic diagram 300 of the situation discussed above. Once the software application 208 is run and a user 302 enters a specific room 304, the software plugin 202 may collect a Behavior Data Segment and transmit the Behavior Data Segment to the server 204 during the session. The Game Designer can then use the viewer application 206 to view Behavior Data Segments from multiple different Users 312 entering the room 304, visualized in the form of heads and hands along with supplementary data describing the environment.

Figure 4:
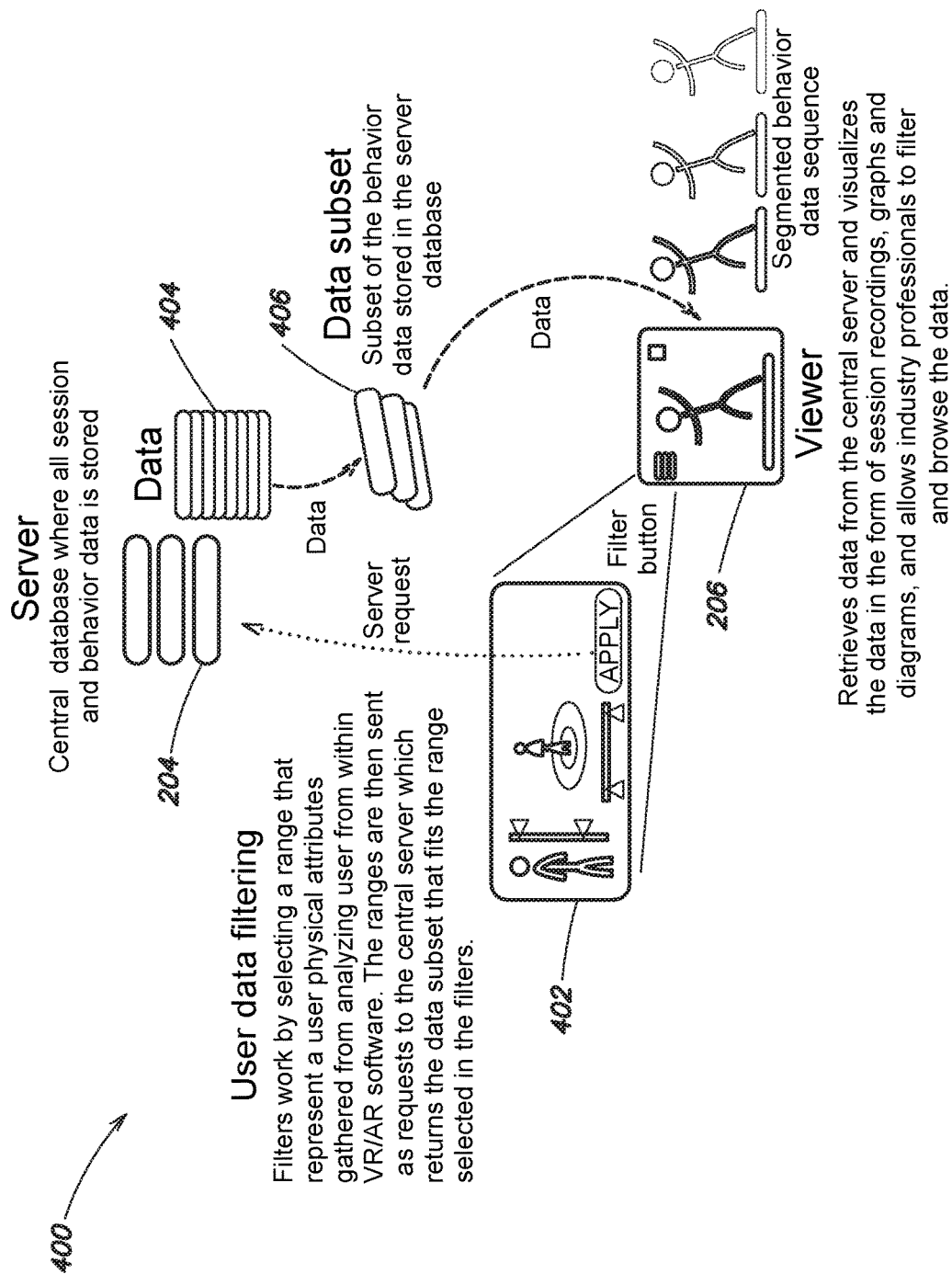
FIG. 4 illustrates a schematic diagram of a filtering operation according to an embodiment.

Consider a situation in which an Industry Professional wants to study whether Users who are relatively short in height behave differently in a certain area of VR/AR content compared to Users who are relatively tall. FIG. 4 illustrates a schematic diagram 400 of the described situation. The Industry Professional specifies the desired User height to be studied using a filtering slider mechanism for User height within a user data filtering module 402. A request is sent to the server 204, which stores, or may otherwise have access to, data 404 indicative of VR/AR content. The server 204 returns a data subset 406 from the data 404 pursuant to the request. The viewer application 206 may display bar charts indicating how much Users of this height physically move around, interact or look around at a particular area.

In another example, a member of a content marketing team may want to know whether Users in China that have small play areas are using the content for shorter periods of time. The member of the content marketing team may specify a User filter for China and the play area size, then views graphs indicating the session length for this User group.

In another example, an Industry Professional wants to analyze whether Users that are highly physically active discover a greater number of hidden secrets than those that are less active. The Industry Professional may specify a filter for the Activity of Users, thereby enabling the Industry Professional to view, for example, statistics and User visualizations showing only highly active Users.

In light of the foregoing example, it is to be appreciated that the disclosed systems and methods present numerous innovations in analyzing VR/AR User behavior based on tracked-input of headsets and motion controllers. The systems and method summarize metrics and visual interpretations of data, emphasizing design factors unique to the VR/AR medium. Solutions are proposed which enable visualization of new design challenges in creating VR, including the space that Users have to move around, tracking issues, User physique and physical behavior (User height, arm reach, etc.).

In creating VR/AR content, the physical behavior and physique (for example, height, weight, stature, and so forth) of Users are new factors in software design, requiring content creators to test and verify that their software functions well regardless of User physique and how Users physically behave. For example, a User who is short might have difficulty reaching a virtual object placed up on a high shelf within VR/AR content. Another example would be that a particular virtual tool is difficult to use for left-handed people because the content creator is right-handed and neglected (or was unable) to test left-handedness. For this reason, it may be advantageous for Industry Professionals to properly test for different behaviors and User physique. Embodiments disclosed herein enable the filtering of data so that data can be filtered according to the physical behavior and physique of Users, allowing only data relating to, for example, Users of a particular height, or Users that are particularly active, to be displayed.

Additionally, User behavior may change depending on Users' VR/AR hardware and software setup. A VR/AR system, for example, includes a tracking volume in which the Users can move freely—but due to modern limitations of tracking systems that volume is limited by the volume of the physical room in which the User is using the VR/AR system, combined with the VR/AR hardware tracking limitations. For example, the tracking volume may only allow forward-facing experiences, so that if the User turns around 180 degrees, the User will be unable to use his hands because the hand-tracking controllers being used are outside of the system's tracking volume.

These kinds of limitations may impact the physical behavior of Users, since Users with forward-facing VR/AR systems will be unable to turn around. Accordingly, Users in small play areas will be less inclined to move freely, etc. Accordingly, it may be advantageous for Industry Professionals to make sure that content designs take into account such limitations, ensuring that the software accommodates the greatest variety of play area sizes and tracking methods.

Embodiments described herein enable Industry Professionals to systematically compare User behavior and software performance based on these new core factors that can drastically influence design. For example, the problems identified above are listed in Table 1 with a corresponding proposed solution according to embodiments discussed herein.

TABLE 1

Problems and Solutions

| Problem | Solution |
| --- | --- |
| What User Behavior Data is collected in order to understand the User experience in VR/AR? | Methods and systems that enable developers to easily define, capture and compare relevant data from VR/AR software applications. |
| How is user experience in VR/AR objectively evaluated and compared? | A method and system to collect and visualize data related to targeted events or moments in time, so that multiple Users experiencing similar events may be efficiently compared. |
| How can the physique, physical movement and behavior of Users in VR/AR be quantified and visualized? | Methods and systems to generate aggregate statistics and graph visualizations describing physical User movements, physique and behavior. |
| How can data be filtered and organized based on the physique, physical movement and behavior of Users in VR/AR? | Filtering system for data derived from physical movements, emotional state, VR/AR hardware setup, session state and behavior of Users. This may include a graphical-User interface to intuitively and quickly apply filtering mechanisms. |

The illustrated approach to collecting targeted Behavior Data Segments relating to specific events may provide several advantages. For example, the illustrated approach may (a) make the collection and processing more technically feasible (low CPU usage and low bandwidth required to transmit data), (b) enable the collection of higher quality data sampling because shorter session segments are targeted rather than full recordings, and (c) offer more flexibility in collecting additional data, since network bandwidth is not being used to collect data from an entire User session, and (d) make the comparison of multiple Users a less daunting undertaking, since the illustrated approach offers more targeted review of the User experience.

Additional advantages may be provided in data visualization. Some past and current attempts to visualize VR/AR data have attempted to collect and visualize the full User session in VR, registering various software events that occur during playthrough. Embodiments disclosed herein enable collection of shorter data segments tied to specific moments and events, thereby enabling streamlined comparison of Users experiencing the same moments or events, even if actions are not performed in the same sequence.

In one aspect, a solution includes methods to collect contextual data that represents objects or elements in the vicinity of the User. The only attempts to date to provide contextual data for User recordings have involved exporting the 3D model of the entire User's environment. Certain disclosed embodiments are unique and more targeted. Disclosed visualization techniques may utilize labels to represent the position of objects/elements in the User's environment (as well as techniques to generate visual approximations of the environment that the User was within).

In another aspect, approximations of the virtual environment in which a software plugin (for example, the software plugin 202) is integrated are created. This technique and system may generate a point-cloud representation of a specified virtual area by raycasting into the virtual environment, saving the points where the raycasts hit simulated 3D geometry. These points can then be uploaded to one or more servers (for example, the server 204), thereby enabling visualization software to save approximate representations of the virtual environment in Behavior Data during the development process or at run-time when a User session is taking place, thereby bypassing the need to export 3D models and textures.

The method may be in the form of what is referred to as Near-Field Point Clouds, which may be dynamically-generated point-clouds at runtime, focused only on targeted areas directly in the user's field of view. The point-cloud is generated by raycasting forward at a fixed timestep from the eyes of the user in a cone that approximates the user's field of view, or alternatively a smaller or larger field of view. The raycast may only project a developer-defined distance into the environment, so instead of capturing the entire environment in a 360 degree radius around the player, a representation is presented showing what the user is seeing directly in front of him.

This enables visualization of the environment closest to the user while saving data required to represent the environment. The density and dispersal of points may be dynamically adjusted so that the number of points can be as few or as many as required to represent the environment in sufficient detail. Near-Field Point Clouds limit the amount of data required to represent the environment, while still representing the key elements that the user is seeing in close proximity.

Currently, there have been no public attempts to filter VR/AR session and behavior data based on metrics derived from physical behavior and activity of Users or their emotional states. Aspects of the disclosure provide a way to dynamically filter Behavior Data based on unique metrics relating to the physique, physical movements and activities of Users. Filtering is an effective and reliable way to study different User groups of the VR/AR software.

Previous attempts at collecting and visualizing User data have focused on recording the entirety of User behavior throughout a full session. Certain embodiments disclosed herein focus on collecting and visualizing data by tying the data to a specific event or moment in time that Industry Professionals want to study in detail. This segmentation of new types of Behavior Data into Behavior Data Segments allows quicker and more targeted comparison of multiple Users experiencing the same or similar events, even if the Users experienced them at different points in their session timeline. Filtering of User Behavior Data based on metrics unique to VR/AR (physical movement, emotional state derived from physical movement) has not been done before.

The typical solution to comparing behavior of multiple Users is manual observation or alternatively observation of video/screen capture recordings of User sessions. In collecting VR/AR input data and visualizing the data as a representation of Users instead of video/screen capture recordings, the typical approach is to collect data from the entire User session and then processing it afterwards to identify areas of interest. Certain disclosed approaches collect targeted segments tied to particular events in time, which is unique because less data is being recorded as compared to recording entire sessions.

Filtering aggregate User data and User recordings based on emotion and physical activity is unique at least because these are new types of hardware and input data. Current solutions are focused on more conventional metrics for VR/AR such as User retention based on how often they play, what devices they use, etc.

A conventional approach is to capture all session data and show aggregate data segments within a full session recording, then generating aggregate metrics for full sessions. Embodiments disclosed herein visualize targeted segments of data for comparison of multiple Users experiencing or performing similar actions or experiencing similar events.

Figure 5:
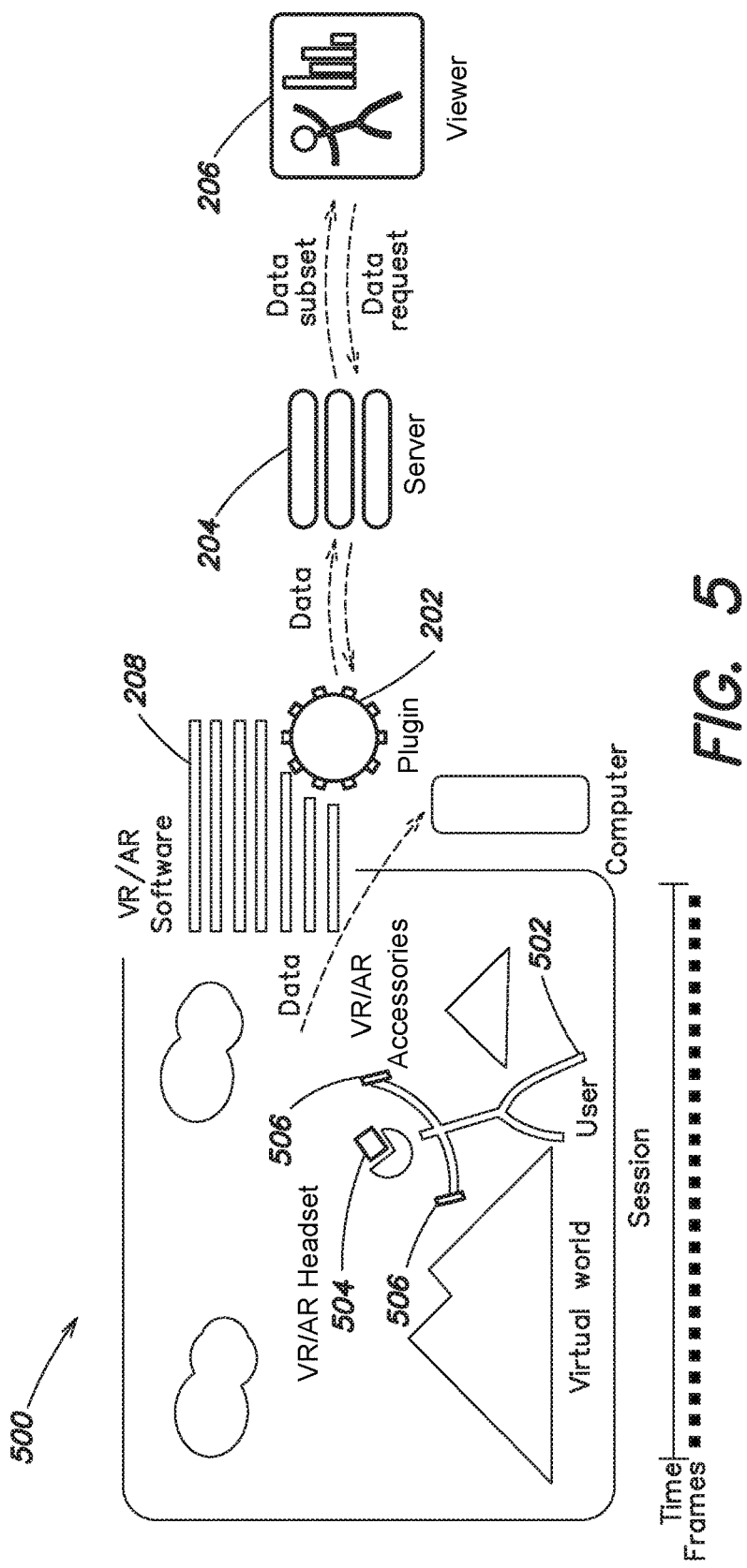
FIG. 5 illustrates a system for viewing VR/AR data according to an embodiment.

FIG. 5 illustrates a system 500 for viewing VR/AR data according to an embodiment. The system 500 involves a human being 502 using the VR/AR software 208 that incorporates the use of a VR/AR headset 504 and accessories 506 for a period of time. During the User session, data is gathered by the software plugin 202, processed, and periodically sent to the server 204 for storage and further processing. Part of the Behavior Data is comprised of frames where each frame contains information (object data) for position, orientation, name, timestamp of the User's body as well as objects within the software.

The viewer application 206 may then be used by Industry Professionals to analyze the data effectively by browsing a subset of the data and statistics from the data available on the server 204. The transmission of data may be encrypted, so that before data is transmitted to the server 204, the software plugin 202 encrypts the data, or sensitive portions of the data, to ensure security. The server 204 then decrypts the data upon receiving it. This encryption may also be used when the viewer application 206 requests data to display from the server 204.

Figure 6:
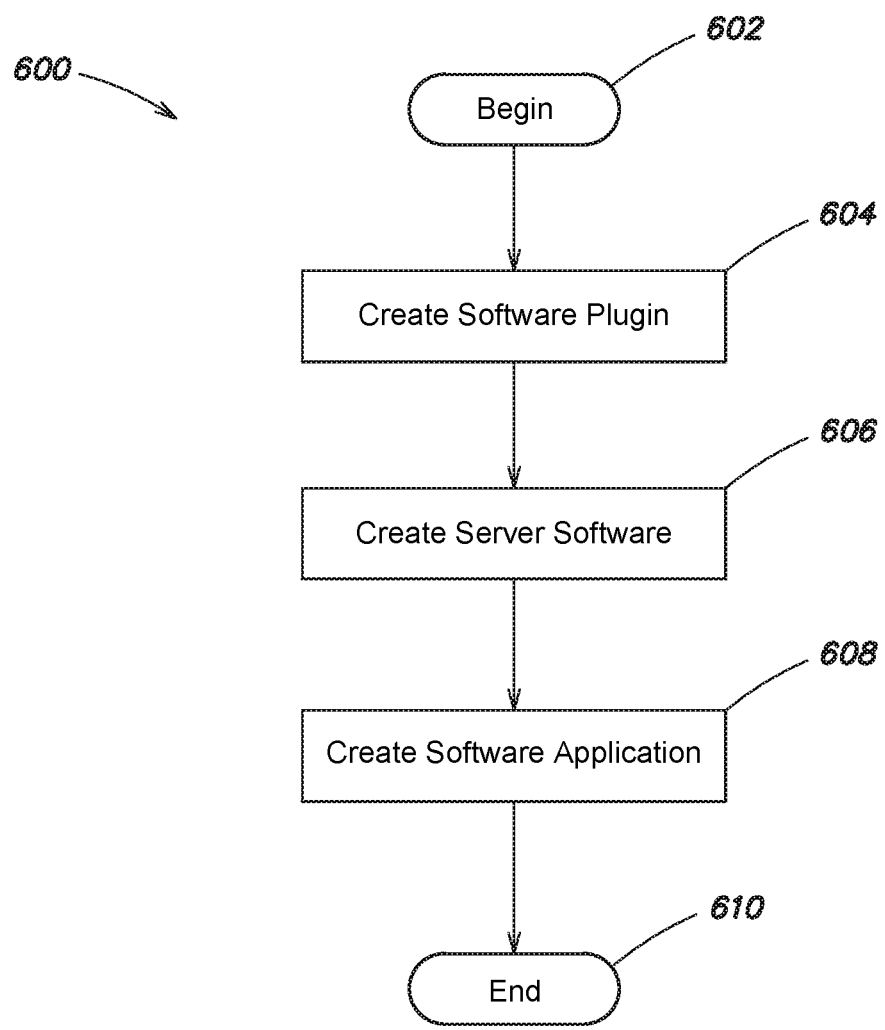
FIG. 6 illustrates a process of enabling analysis of a VR/AR environment according to an embodiment.

FIG. 6 illustrates a process 600 of enabling analysis of a VR/AR environment according to an embodiment. At act 602, the process 600 begins. At act 604, a software plugin is created. For example, the software plugin may be capable of being integrated into existing VR/AR software. The software plugin may be configured to collect Behavior Data (for example, VR/AR positional data representing physical movements and actions), allow Industry Professionals to specify targeted events or moments in time that should be collected, along with contextual data about the User environment (position of objects within the virtual world and name of elements, for example), and transmit this data to a server where the data is stored in a database.

At act 606, server software is created. For example, the server software may be implemented on the server to which the data collected by the software plugin is sent. The server software may be configured to receive and process the data, and generate averages and statistics that enable filtering and comparison.

At act 608, a software application is created. For example, the software application may be configured to be communicatively coupled to the server software created at act 606. The software application may be configured to retrieve, visualize, and enable filtering of the data. At act 610, the process 600 ends.

Figure 7:
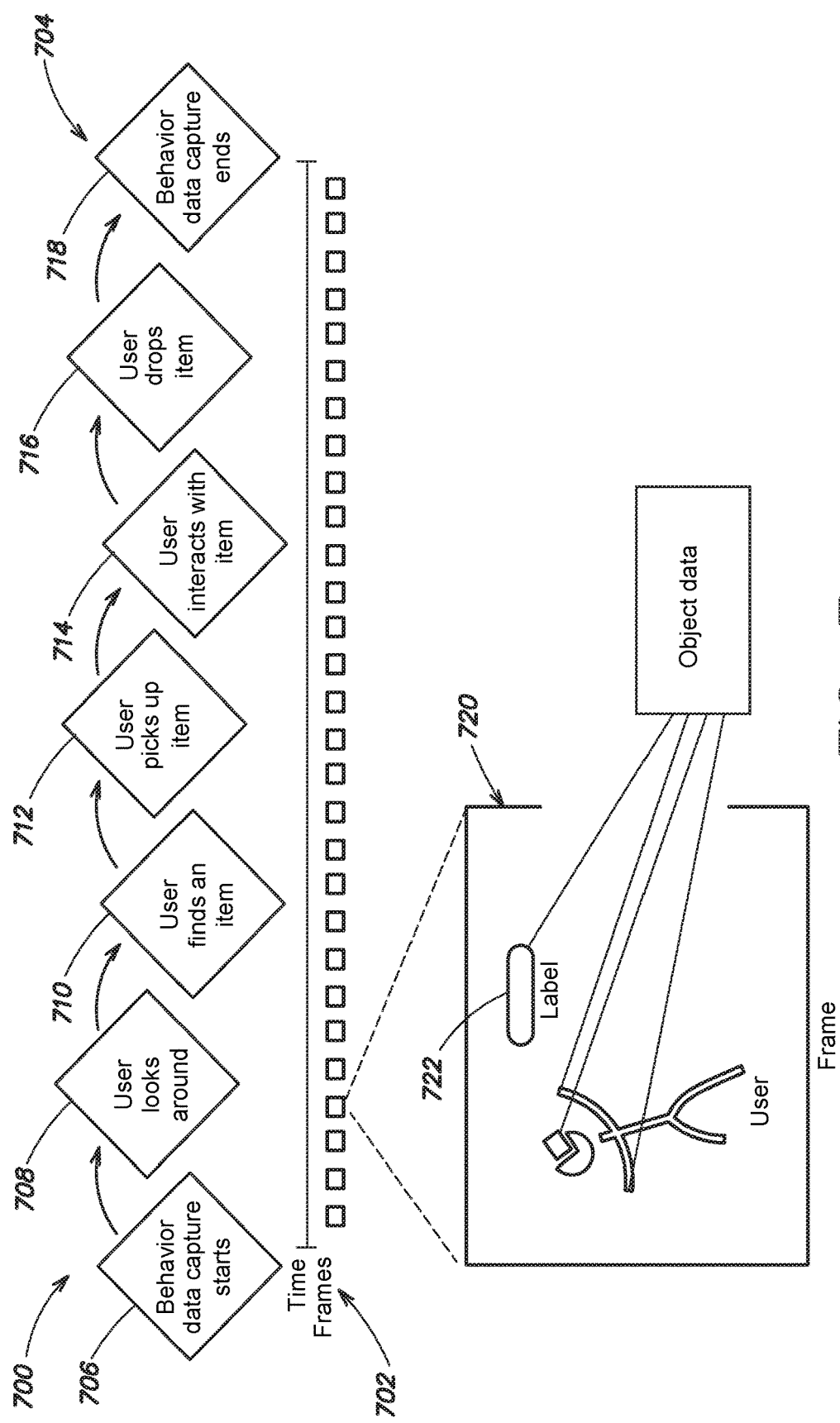
FIG. 7 illustrates a schematic diagram of a behavior data capture example according to an embodiment.

FIG. 7 illustrates a schematic diagram 700 of a behavior data capture example according to an embodiment. The schematic diagram 700 illustrates a plurality of Behavior Data Segments 702 captured over a period of time. The period of time is characterized at least in part by the occurrence of a plurality of events 704. At a first event 706, the behavior data capture starts. At a second event 708, a user begins to look around in a virtual environment. At a third event 710, the user finds an item. At a fourth event 712, the user picks up the item. At a fifth event 714, the user interacts with the item. At a sixth event 716, the user drops the item. At a seventh event 718, the behavior data capture ends.

A Behavior Data Segment of the plurality of Behavior Data Segments 702 may be selected and viewed by a user. For example, a first Behavior Data Segment 720 may be selected and viewed by a user. The first Behavior Data Segment 720 includes timestamped position and orientation information of the User's head and hands, based on tracking data from the head-mounted display (VR/AR headset), motion controllers, gloves and/or other accessories that track the User's body parts and physical expressions.

The first behavior data segment 720 may also include timestamped position and orientation of elements in the User's virtual environment (virtual walls, tables, objects, audiosources, characters, etc.) and physical environment (e.g. sensors that track User movements, physical hardware accessories). Text labels, such as a first text label 722, may be provided describing what each element is, or what each element represents. There may be none, one or more elements included in Behavior Data Segments, added as required to properly describe the context of the environment. The contextual data may be visualized as 2D or 3D text labels, floating text or alternatively represented as a 3D model.

The behavior data segment 704 may also include timestamped audio levels for each ear of the User (i.e. output levels to headphones or stereo speakers), and may additionally include timestamped positional data indicating where in the virtual environment this audio is coming from.

Figure 8:
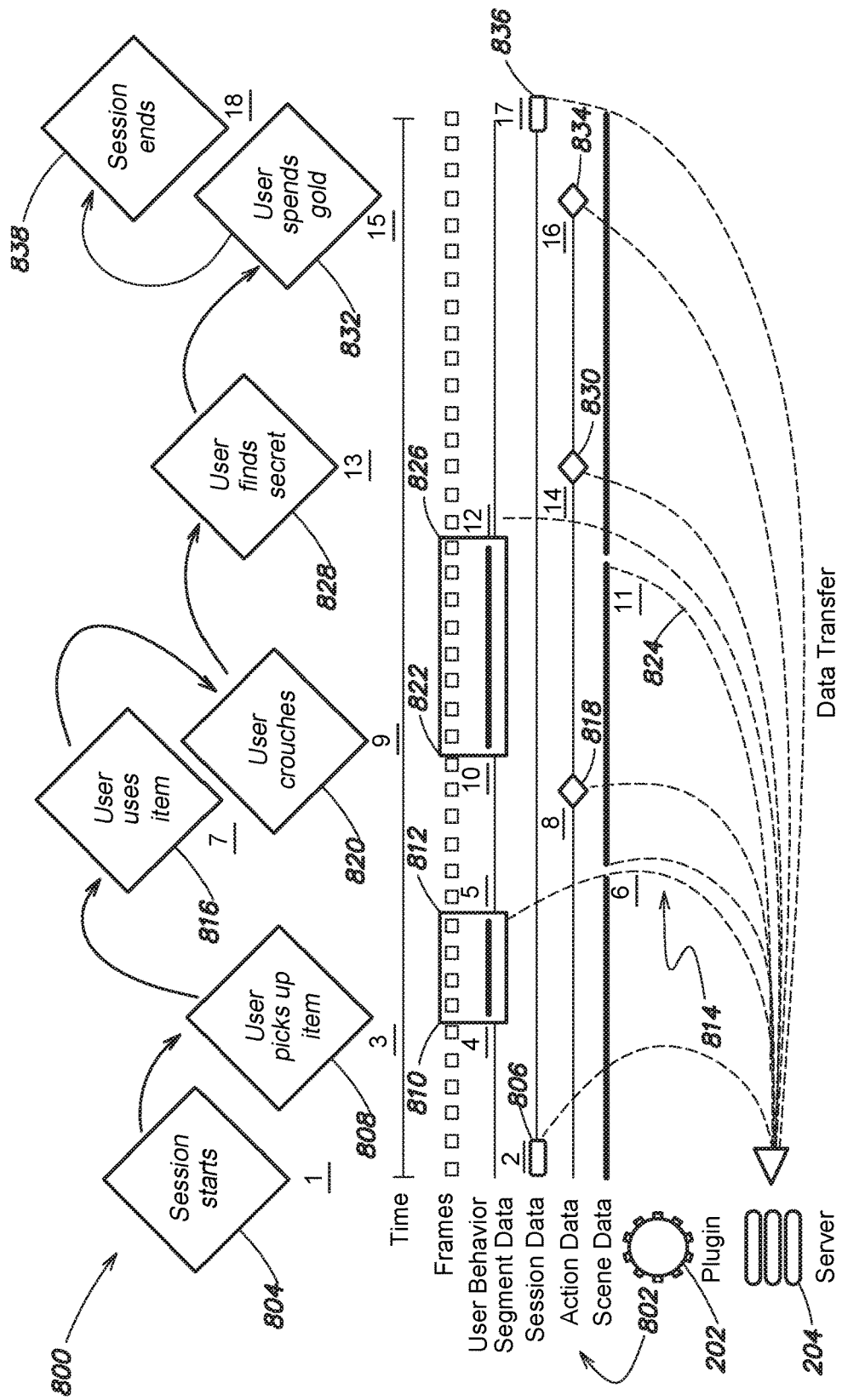
FIG. 8 illustrates a schematic diagram of a VR/AR user session example according to an embodiment.

FIG. 8 illustrates a schematic diagram 800 of a VR/AR user session example according to an embodiment. The schematic diagram 800 illustrates session information 802 including user behavior segment data, session data, action data, and scene data collected once a User launches a VR/AR software application running on a networked computational device. Table 2 illustrates examples of the session information 802. The session information 802 is captured over a period of time characterized at least in part by the occurrence of a plurality of events.

At a first event 804, a user session starts. At a second event 806, the software plugin 202 collects session data for the session (which may include VR hardware setup information), and sends a data transmission containing the data to the server 204. The software plugin 202 also begins a process of periodical calculations that occur at an interval specified in one of the software plugin 202 and the server 204.

At a third event 808, a User picks up an item. At a fourth event 810, behavior data segment recording of tracking data begins. At a fifth event 812, behavior data segment stops recording and the data is sent to the server 204. At a sixth event 814, scene data, which may contain averages of User behavior metrics, is sent to the server 204. At a seventh event 816, the User uses the item. At an eighth event 818, action data (which may describe the User using the item) is gathered and sent to the server 204.

At a ninth event 820, the User crouches. At a tenth event 822, Behavior Data segment recording of tracking data begins. At an eleventh event 824, Scene Data, which may contain averages of User behavior metrics, is sent to the server 204. At a twelfth event 826, the Behavior Data segment stops recording and the data is sent to the server 204. At a thirteenth event 828, the User finds a secret.

At a fourteenth event 830, Action Data, which may describe the User finding the secret, is gathered and sent to the server 204. At a fifteenth event 832, the User spends gold. At a sixteenth event 834, Action Data, which may describe the User spending gold, is gathered and sent to the server 204. At a seventeenth event 836, Session Data for the session, which may include metrics gathered and calculated over the entire session, is sent to the server 204. At an eighteenth event 838, the user session ends.

TABLE 2

Session Information Examples

| Behavior Data Segment | Session Data | Action Data | Scene Data |
|---|---|---|---|
| ❖Category | ❖ActivityLevels | ❖ActionID | ❖BoundsVisibleDuration |
| ❖GazeActivity | ➢Controller_L | ❖ActionName | ❖Head |
| ❖HandMovementActivity_Left |   Positional | ❖Category | ➢HeadRotationDistance |
| ❖HandMovementActivity_Right |   PositionalPerS | ❖MomentIDs | ➢HeadRotationPerS |
| ❖HeadMovementActivity | ➢Controller_R | ❖PlayerPos | ➢LostTrackingDuration |
| ❖InteractionsLeft |   Positional |   ➢x | ➢Movement |
| ❖InteractionsRight |   PositionalPerS |   ➢y | ➢MovementPerS |
| ❖MomentID | ➢Headset |   ➢z | ❖LeftHand |
| ❖MomentName |   Angular | ❖SceneName | ➢Button0 |
| ❖SceneName |   AngularPerS | ❖SessionID | ➢Button0_PerS |
| ❖SessionID |   Positional | ❖SessionTime | ➢Button1 |
| ❖SessionTimestamp |   PositionalPerS | stamp | ➢Button1_PerS |
| ❖TimeStamp | ❖EngineQualitySettings | ❖Timestamp | ➢Button2 |
| ❖TrackingData |   ➢AnisotropicFiltering | | ➢Button2_PerS |
|   ➢AudioLevel_L |   ➢AntiAliasing | | ➢Button3 |
|   ➢AudioLevel_R |   ➢Engine | | ➢Button3_PerS |
|   ➢BoundariesVisible |   ➢PixelLightCount | | ➢Button4 |
|   ➢DynamicSensors |   ➢QualitySetting | | ➢Button4_PerS |
|     Position |   ➢TextureResolution | | ➢Button5 |
|       x |   ➢Version | | ➢Button5_PerS |
|       y | ❖Hardware | | ➢Button6 |
|       z |   ➢CPU | | ➢Button6_PerS |
|     SensorName |   ➢GPU | | ➢LostTrackingDuration |
|   ➢Hand_L |   ➢Language | | ➢Movement |
|     HasTracking |   ➢Memory | | ➢MovementPerS |
|     Input |   ➢OS | | ❖RightHand |
|     Orientation |   ➢Platform | | ➢Button0 |
|       w | ❖Session | | ➢Button0_PerS |
|       x |   ➢BuildID | | ➢Button1 |
|       y |   ➢Completed | | ➢Button1_PerS |
|       z |   ➢EndTimeStamp | | ➢Button2 |
|     Position |   ➢SessionDuration | | ➢Button2_PerS |
|       x |   ➢StartTimeStamp | | ➢Button3 |
|       y |   ➢TimeOut | | ➢Button3_PerS |
|       z |   ➢UserID | | ➢Button4 |

TABLE 2-continued

Session Information Examples

| Behavior Data Segment | Session Data | Action Data | Scene Data |
|---|---|---|---|
| ➤Hand_R | ❖SessionID | | ➤Button4_PerS |
|   HasTracking | ➤TimeStamp | | ➤Button5 |
|   Input | ➤VRSetup | | ➤Button5_PerS |
|   Orientation |   AsyncSetting | | ➤Button6 |
|     w |   HMD_Model_ID | | ➤Button6_PerS |
|     x |   HeadHeight | | ➤LostTrackingDuration |
|     y |   IPD | | ➤Movement |
|     z |   PlayAreaBounds | | ➤MovementPerS |
|   Position |     x | | ❖SceneDuration |
|     x |     y | | ❖SceneID |
|     y |   PlayAreaMin | | ❖SceneName |
|     z |   PlayAreaSize | | ❖ScenePerformance |
| ➤Head |     x | | ➤Good |
|   HasTracking |     y | | ➤Poor |
|   Orientation |   RenderTargetMultiplier | | ➤Substandard |
|     w |   TrackingEquipmentCount | | ❖SessionID |
|     x |   TrackingEquipments | | ❖TimeStamp |
|     y |     Orientation | | |
|     z |       w | | |
|   Position |       x | | |
|     x |       y | | |
|     y |       z | | |
|     z |     Position | | |
| ➤Player |       x | | |
|   Orientation |       y | | |
|     w |       z | | |
|     x |     TrackingSystem | | |
|     y |   VR_Platform | | |
|     z | ➤geoip | | |
|   Position |   city_name | | |
|     x |   continent_code | | |
|     y |   continent_name | | |
|     z |   country_code2 | | |
| ➤StaticSensors |   country_code3 | | |
|   Position |   country_name | | |
|     x |   ip | | |
|     y |   latitude | | |
|     z |   location | | |
|   SensorName |   longitude | | |
| ➤TimeStamp |   real_region_name | | |
| ❖TrackingLossHeadset |   region_name | | |
| ❖TrackingLossLeftController |   timezone | | |
| ❖TrackingLossRightController | ➤projectId | | |
| ❖TrackingRate | ➤subscriberId | | |

Figure 9:
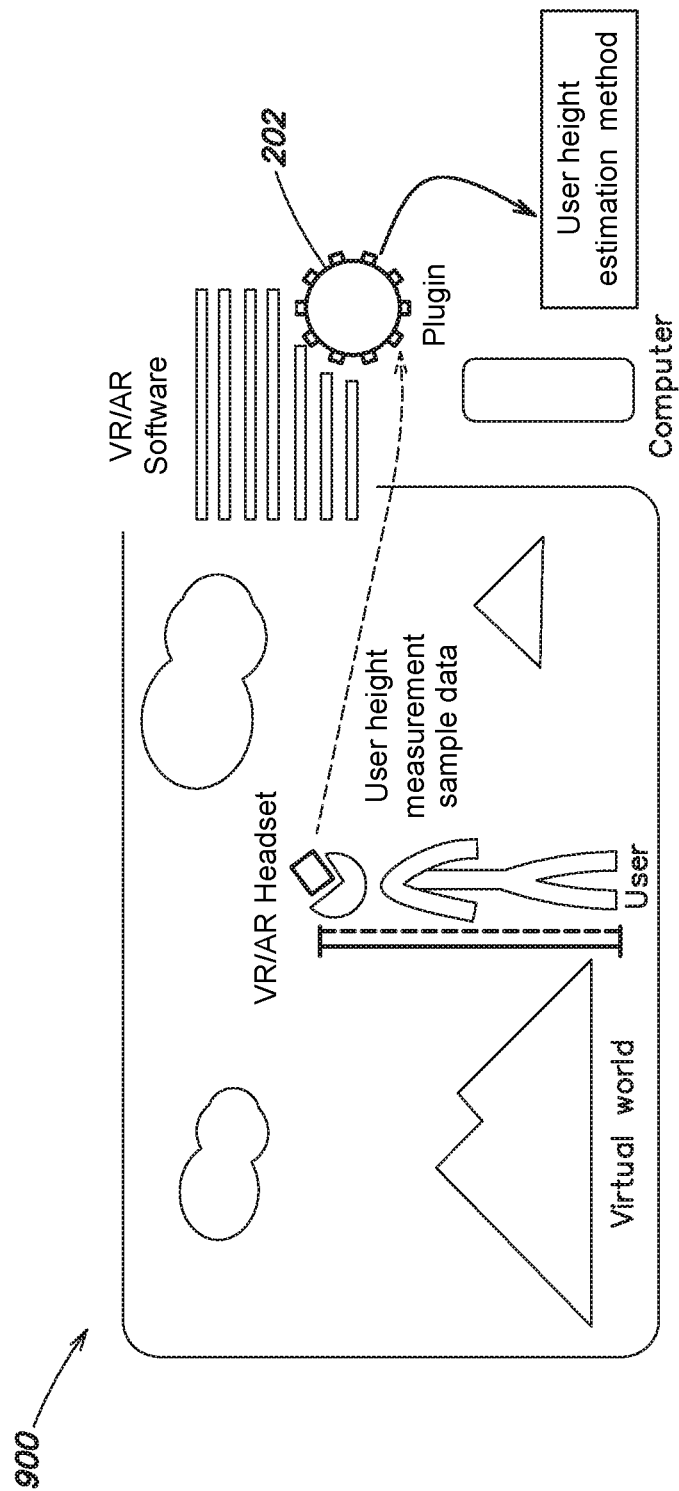
FIG. 9 illustrates a schematic diagram of an example of estimating a height of Users according to an embodiment.

FIG. 9 illustrates a schematic diagram 900 of an example of estimating a User height of Users according to an embodiment. For example, the software plugin 202 may estimate a User height at run-time, during a User session and returns an accurate approximation of how tall Users are physically, based on the physical location of the VR/AR headset during software usage.

Figure 10:
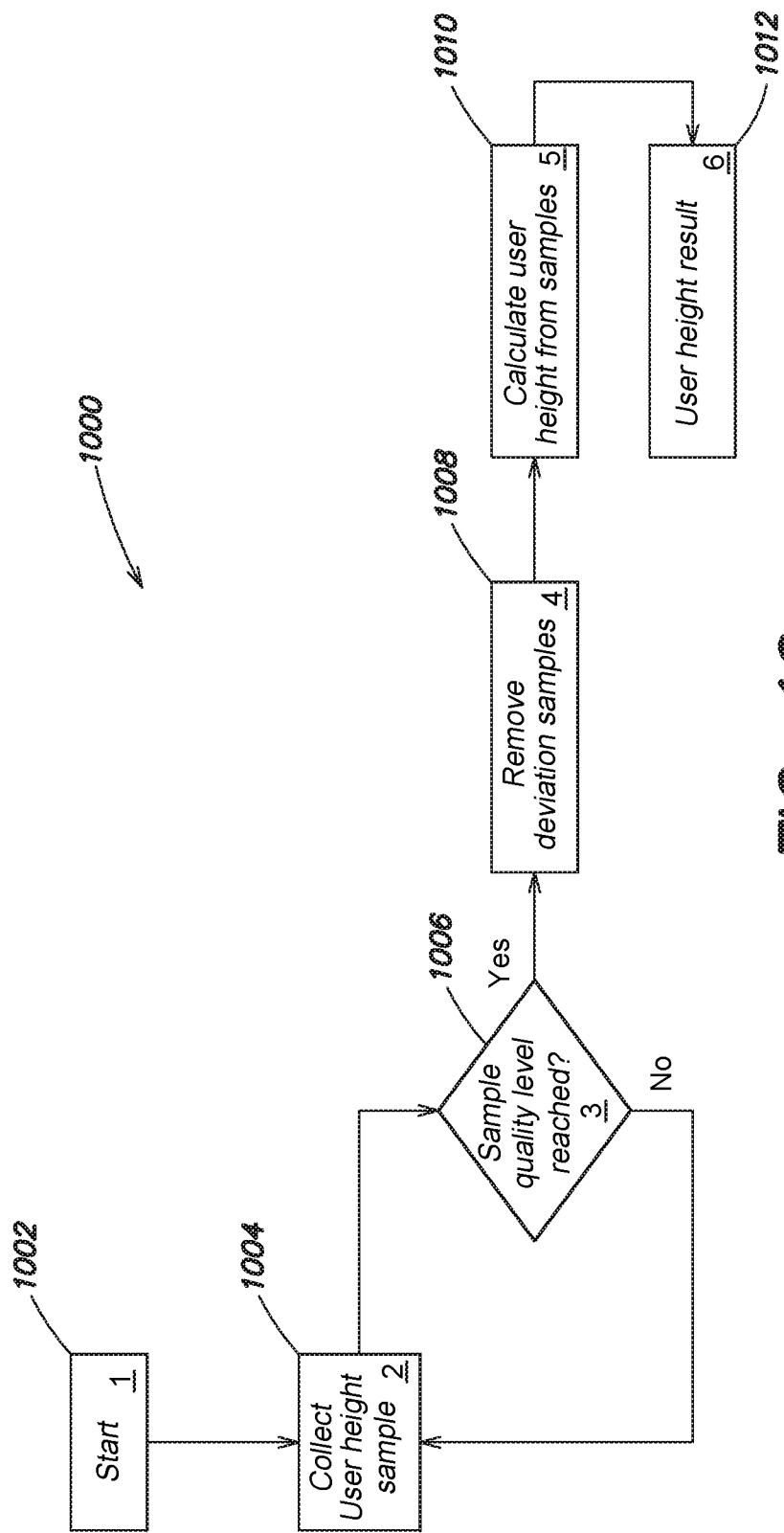
FIG. 10 illustrates a process for estimating a user's height according to an embodiment.

FIG. 10 illustrates a process 1000 executed by the software plugin 202 for estimating a User's height. At a first act 1002, the process 1000 begins. At a second act 1004, a user height measurement sample is collected. For example, a measurement of a User's height may be based on a VR/AR headset distance from physical ground position.

At a third act 1006, a determination is made as to whether a last-collected sample (1) achieved a required sample maximum; (2) was collected during actual usage of the VR/AR headset; and (3) indicated that the User was looking forward and not facing up or down. If not, the process 1000 returns to the second act 1004. Otherwise, the process 1000 continues to a fourth act 1008.

At the fourth act 1008, deviant samples are removed. For example, deviant samples may be samples that deviate from average calculations of other samples. At a fifth act 1010, a User height is calculated from the samples. For example, the User height may be calculated using estimated eye height on models that describe a relationship between a user's eye height and a user's actual height. At a sixth act 1012, a User height result is returned.

Figure 11:
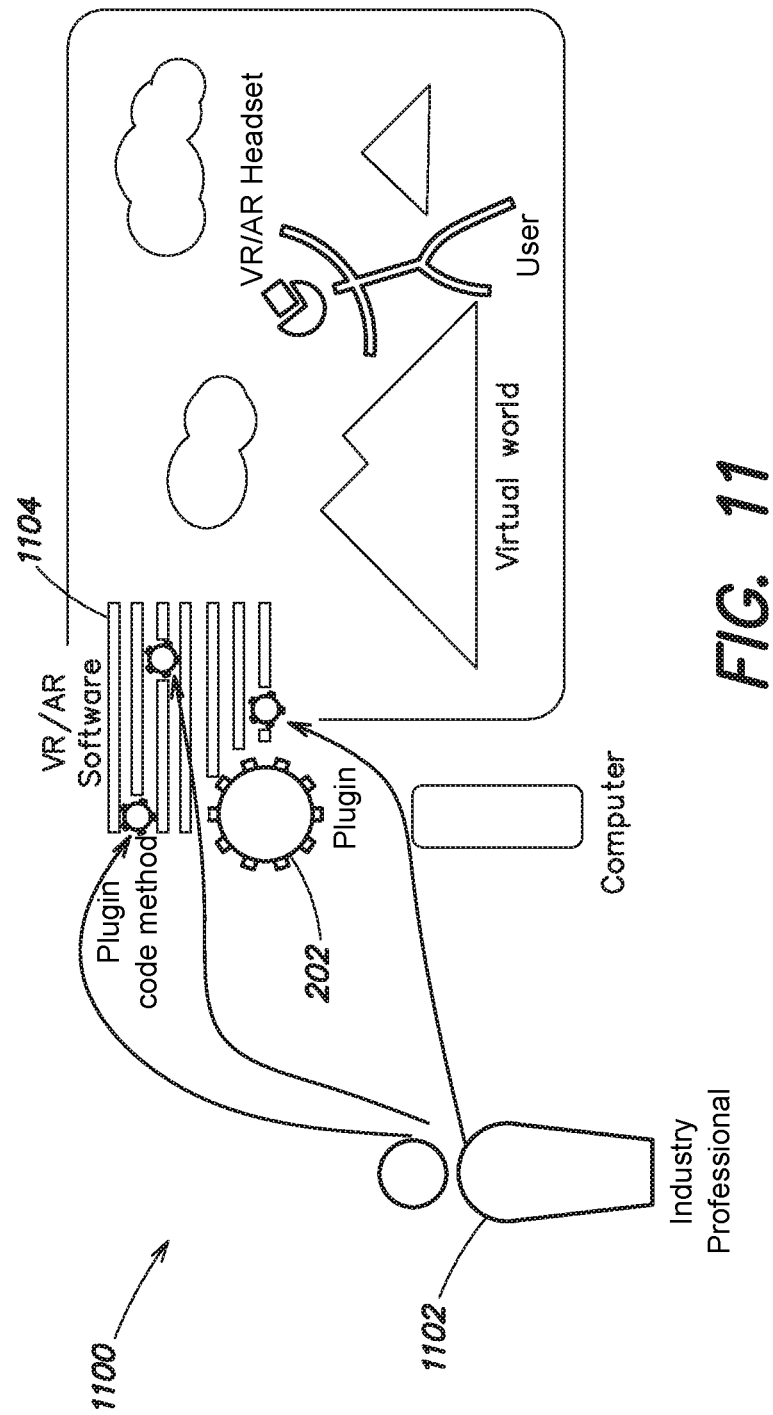
FIG. 11 illustrates a schematic diagram of importing the software plugin into an existing VR/AR software project.

The software plugin 202 contains code (SDK) that Industry Professionals or developers can integrate in their own VR/AR software. FIG. 11 illustrates a schematic diagram 1100 of an Industry Professional 1102 integrating the software plugin 202 with an existing VR/AR software project 1104. The procedure begins by importing the software plugin 202 into an existing VR/AR software project 1104, followed by a selection of available settings. The Industry Professional or developer 1102 then implements a set of code for tracking particular segments of Behavior Data, actions performed, segmenting state context areas of the software and other custom data. Alternatively, the Industry Professional or developer 1102 can utilize a component that does not require code, and works by manually placing a tracker object within software that represents a virtual environment for targeted recording of User Behavior Data Segments.

An example will now be described as to how Behavioral Data Segments may be defined. The Industry Professional may want to study how Users behave upon interacting with a specific virtual object in his VR/AR content. He uses the SDK to define the condition that high fidelity Behavior Data Segments should be collected when the User picks up this object, along with specifying contextual data that should be contained in the segment (i.e. the objects and virtual elements in the environment relevant to adequately describing the circumstances in which this event occurs).

The developer controls what the exact conditions are, which can be as simple as an if-then statement/condition or a more complex combination of conditions. Once conditions are met during a user session (i.e. the User picking up this object), Behavior Data Segment collection is triggered. This segment can optionally contain Data back in time to capture what lead to this event taking place, in which case a continuous data recording buffer is used for Behavior Data.

The conditions for recording Behavior Data may be any software event that occurs within the software, allowing the Industry Professional to define the exact code conditions that trigger the recording. The conditions may also be triggered by the physical movements and behavior of the User, for example when he performs a certain physical action (crouching), expresses communicative gestures (hand waving, head shakes) or traits of behavior activity like moving rapidly or exhibiting physical signs of boredom.

The duration of a Behavior Data Segment varies, depending on how much time is needed for the industry professional to properly evaluate a specific event or how long that event is. The event of picking up an object may only require a 10-second time period in which Behavior Data is collected in order to properly evaluate the User's behavior when performing this action, while properly understanding how a User behaves while meeting a virtual character for the first time may require 60 seconds or more.

The time period for which Behavior Data should be collected in a Segment can be specified in advance by the developer, or may alternatively be started and ended manually when specified conditions are met indicating the event being studied is effectively completed. For example, a Segment start may be initiated when a User picks up an interactive object, and when the User places the object back down the Segment is ended. Table 3 illustrates a plurality of commands and conditions with associated descriptions.

TABLE 3

Commands and Conditions

| | |
|---|---|
| StartSession | Starts gathering data |
| SubmitSession | Sends session data to server |
| SetStateContext | Marks segments of your application (e.g., levels, scenes, etc.) |
| Action | Tracks a specific action/event (e.g., User found secret) |
| RecordMoment | Record short moment of User behavior |
| CustomData | Track custom dataset |

In some embodiments, a viewer application (for example, the viewer application 206) is a software application (for example, a standalone PC/Mac application, web browser based application, mobile application, or a VR/AR application) that visualizes metrics and Behavior Data Segments based on User Behavior Data collected from VR/AR software applications. The viewer application retrieves data from one or more servers (for example, the server 204) and offers graphical User interfaces to filter and browse data, enabling Industry Professionals to study User groups and specific Users. In some embodiments, the viewer application may be separated into pages or tabs that each present different types of visualizations and data relating to a particular aspect of User behavior and software functionality statistics. For example, tabs may include one or more of a dashboard tab, a moments tab, an audience tab, a behavior tab, a performance tab, an actions tab, and a live view tab.

Figure 12:
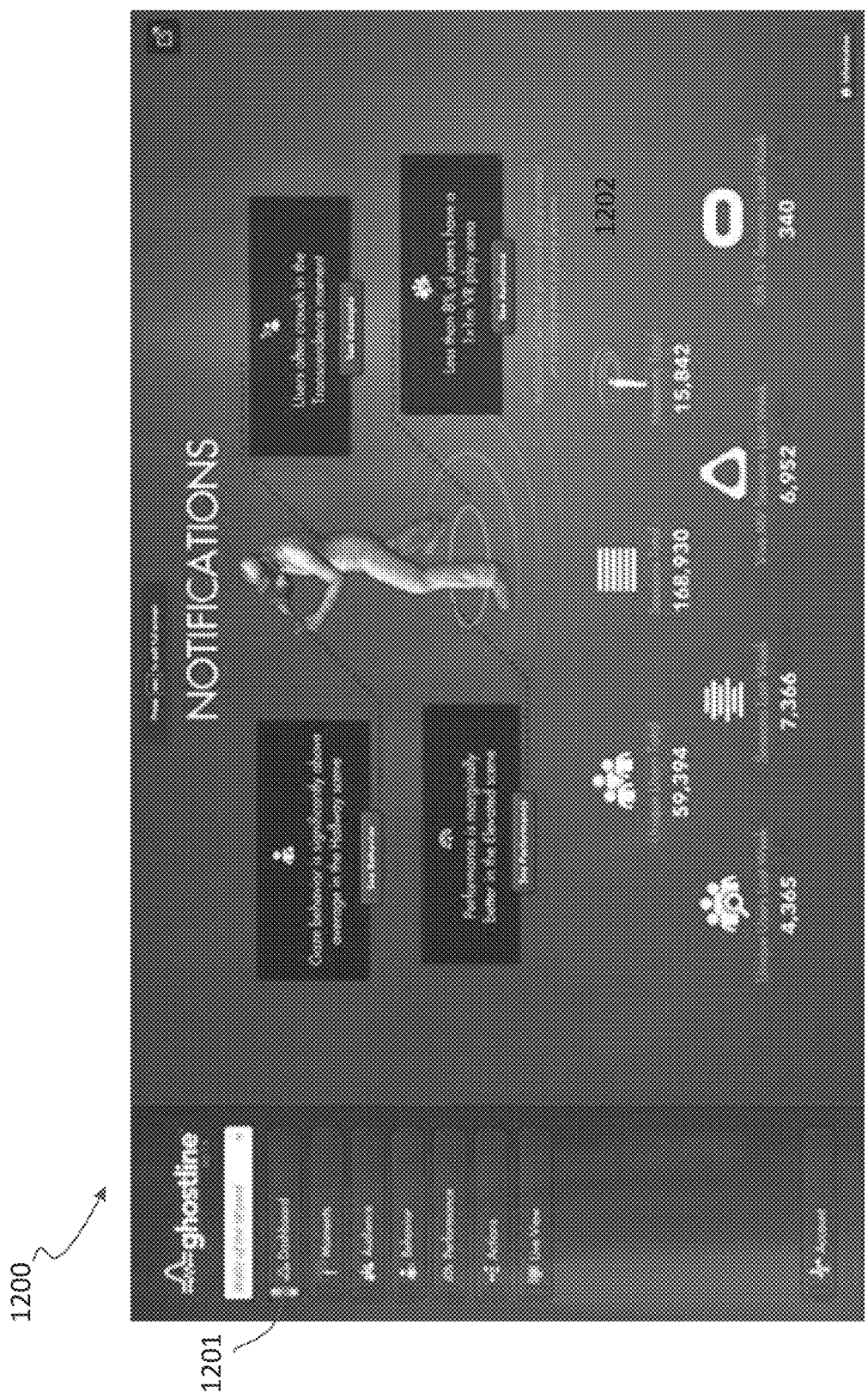
FIG. 12 illustrates a dashboard user interface display according to an embodiment.

FIG. 12 illustrates a dashboard user interface display 1200 according to an embodiment. In some embodiments, the dashboard user interface display 1200 is displayed responsive to selection of a dashboard tab 1201 and gives an instant overview of recent User activity and links to valuable information about the software. Automated notifications are presented on a rotating basis, highlighting statistical deviations and trends/patterns in User behavior, system setups and other statistically inferred events that may be relevant to the Industry Professional studying User behavior in the software application.

For example, a first notification 1202 may indicate that a certain percentage of users have a play area (i.e., a physical volume in which to use a VR/AR system) below a certain area. In another example, if a User group includes Users of short physical height is not behaving in the same way as a User group includes Users of average size in a certain segment of a VR/AR experience, that would be presented as a notification to indicate that there may be a design flaw that impacts short Users.

Figure 13:
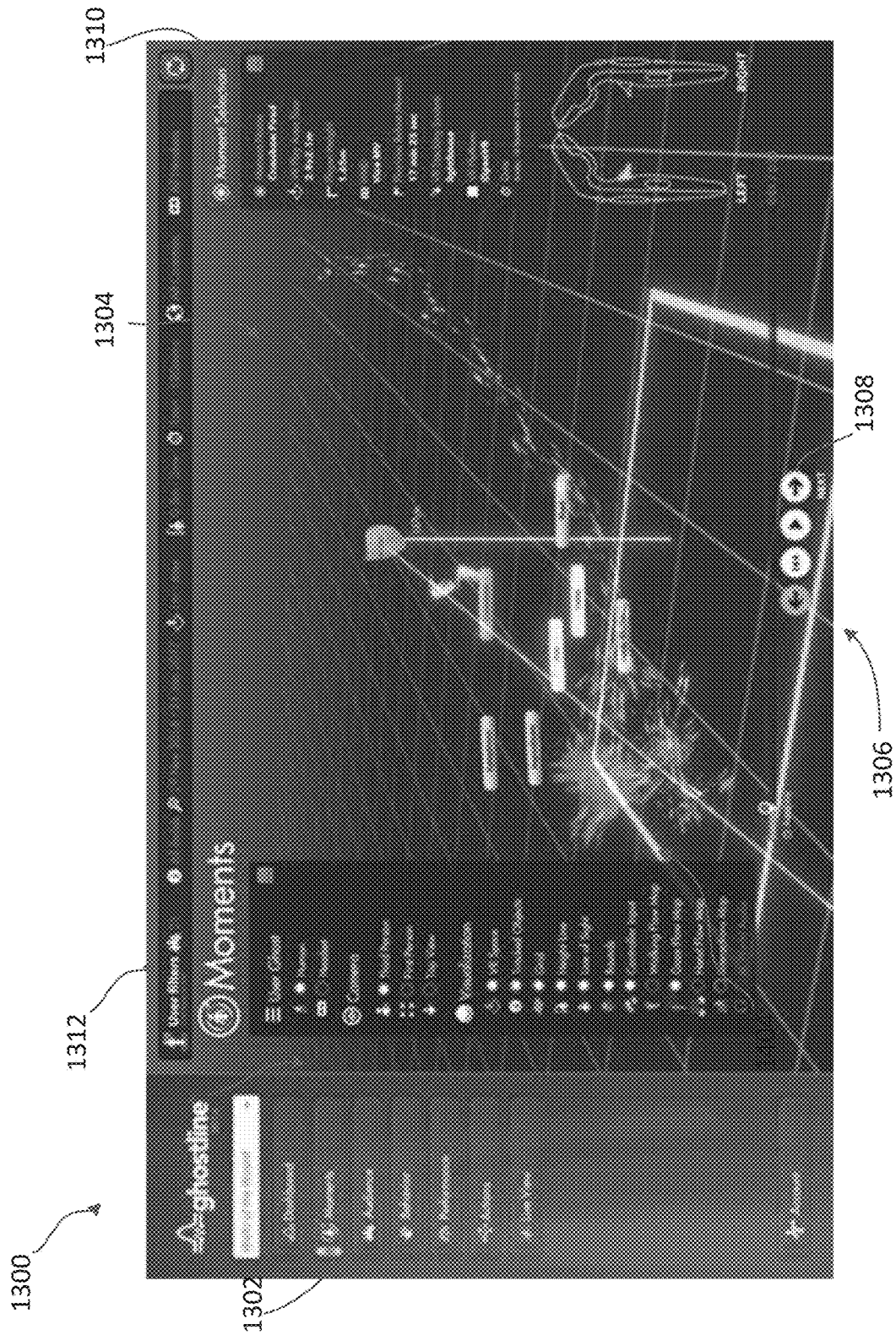
FIG. 13 illustrates a moment user interface display according to an embodiment.

FIG. 13 illustrates a moment user interface display 1300 according to an embodiment. In some embodiments, the moment user interface display 1300 is displayed responsive to selection of a moments tab 1302. Moments are high-fidelity visualizations of Behavior Data Segments displayed in a display field 1304. The Behavior Data Segments may represent the User with animated 3D objects representing movements, along with data describing the virtual- and physical environment of that User (labels and diagrams). Moments visually communicate how Users are experiencing an isolated segment of content, visualizing new design factors unique to VR/AR and helping a viewer understand the complex relationship between Users, designs and VR/AR setups.

The moment user interface display 1300 allows play and pause commands and provides a timeline for scrolling backwards and forwards in time with a control panel 1306. The timeline may be annotated with events that occur throughout this Behavior Data Segment. The Industry Professional using the software can click a "Next" arrow 1308 to quickly switch from one User to another, thereby efficiently comparing multiple Users experiencing the same or similar events in time.

The moment user interface display 1300 represents the User's body as one or more 3D approximations, such as hands and face, but may also be represented with other 3D models such as a 3D model of a VR/AR headset or hand-tracking accessories (motion controllers, gloves). Additional accessories and body-tracking sensors may be included in this data, in which case the visualization may include additional body-parts such as: a human heart at an approximate location near the chest, animated in sync with sensor data that measured User heart rate during the User Session; a human brain at an approximate location by the head, representing brainwave sensor data that measured neural activity throughout the User Session; lungs at an approximate location by the chest, animated in an expanding/contracting fashion representing User breathing rate as measured by sensors during the session; and eyes at an approximate location on the head, animated to accurately reflect eye-tracking movement data collected through eye-tracking sensors.

The moment user interface display 1300 visualization of the User may include additional animations for any body part or physical activity being visualized, so that the 3D model representing the User's face may include animated facial expressions provided that facial expression data was recorded and included in the Behavior Data Segment.

The visualization may also include aggregate data from all Behavior Data Segments collected for this particular event, so that an Industry Professional can see visual representations and statistics for how the majority of Users behave during this particular event or moment in time. Such aggregate data may be visualized as heat maps and labels representing locations and trajectories of physical User movement, User gaze, location heat maps for where the User attempted to interact or where the User performed communicative or expressive physical gestures.

Consider an example of Aggregate Data in which head rotation/orientation data may be averaged for all Users for which a Behavior Data Segment was collected. This rotation data may be extrapolated to represent the approximate trajectory of User gaze. The "gaze flow" is represented as moving particles, where the direction and speed of movement represents the average direction and average speed of head movement for all Users for the specific Behavior Data Segment that an Industry Professional is actively studying. Aggregate data may also be represented as statistics overlaid on the environment, so that if a virtual object is represented with a label then additional statistics may be displayed nearby in number format, describing how many interacted with this particular object, how long this object was in Users' visual field of view, etc.

Figure 14:
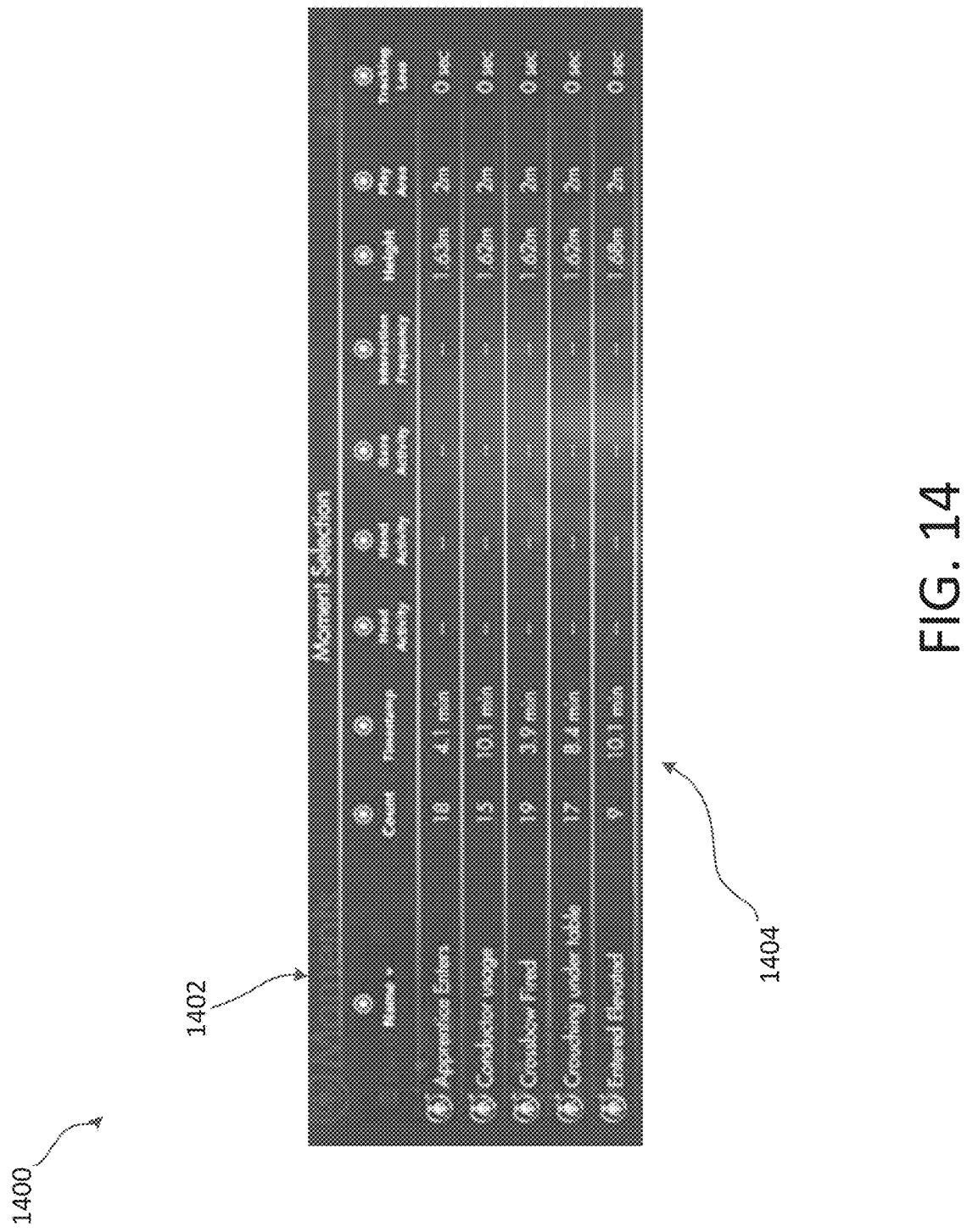
FIG. 14 illustrates a moment selection screen according to an embodiment.

The moment user interface display 1300 further includes a moment selection button 1310 and a user filters selection button 1312. Responsive to selection of the moment selection button 1310, a moment selection screen is opened. FIG. 14 illustrates a moment selection screen 1400 according to an embodiment. The moment selection screen 1400 displays a list of moments 1402 with associated information 1404 to provide a quick snapshot of relevant information. Selection of a moment from the list of moments 1402 may display the moment user interface display 1300 with information pertinent to the moment selected from the list of moments 1402.

Figure 15:
FIG. 15 illustrates a user filters screen according to an embodiment.

Responsive to selection of the user filters button 1312, a user filters screen is opened. FIG. 15 illustrates a user filters screen 1500 according to an embodiment. User filters provide options to segment Users based on VR/AR specific metrics and the behavior of Users (e.g. play area sizes, User height, and more) that impact the way content is experienced. The current version includes filtering by the activity level of Users—a metric derived from the movements that a User performs. Other embodiments may include more nuanced filtering such as the inferred emotional state of Users (e.g., bored or excited) or specific gestures and physical actions they performed (e.g., crouched, jumped, or waved).

Figure 16:
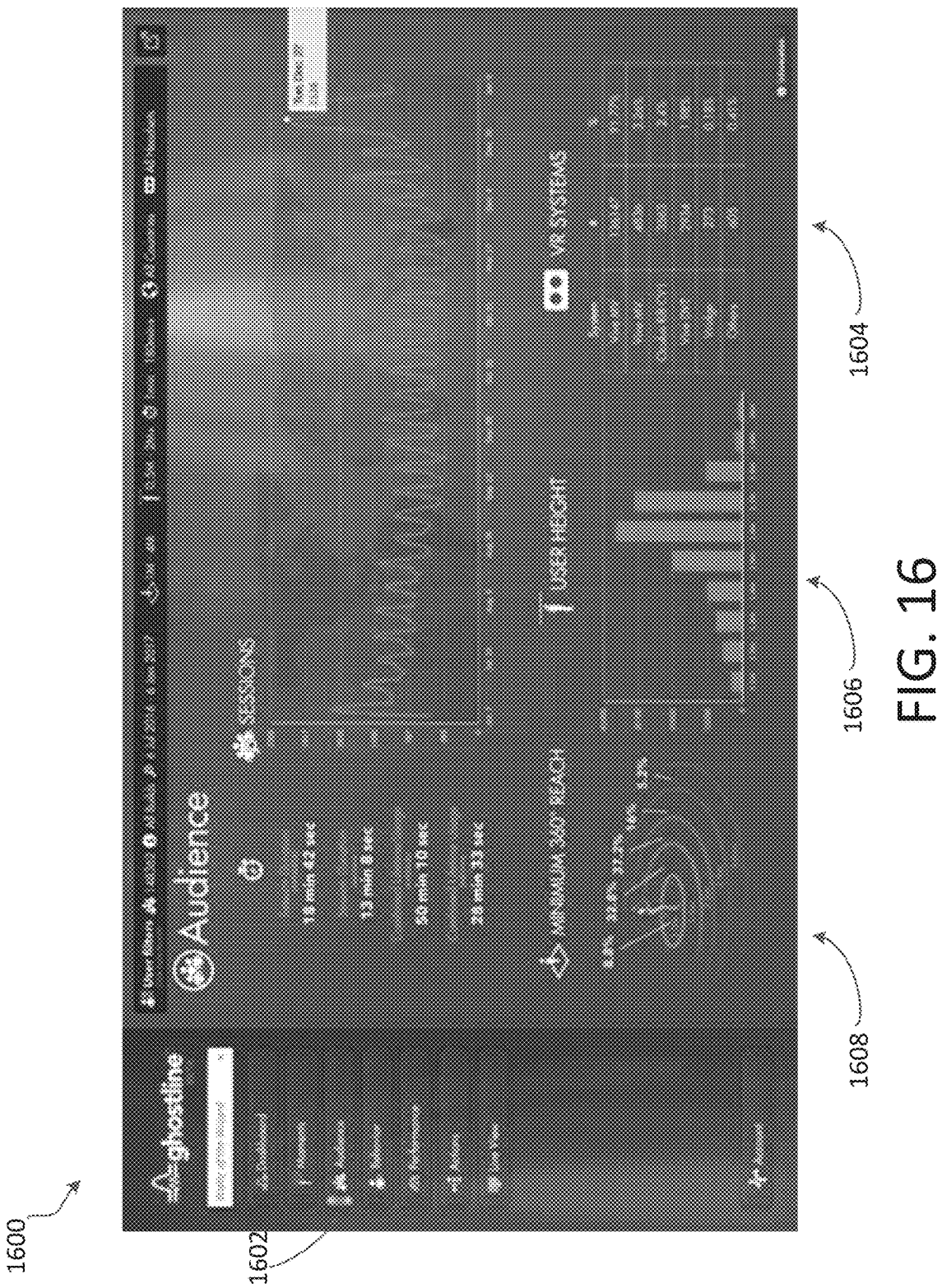
FIG. 16 illustrates an audience user interface display according to an embodiment.

FIG. 16 illustrates an audience user interface display 1600 according to an embodiment. In some embodiments, the audience user interface display 1600 is displayed responsive to selection of an audience tab 1602. The Audience page summarizes usage statistics for the software that the system is integrated in. Filters can be used as application-wide settings to help segment and browse User groups based on VR/AR specific metrics. For example, a viewer may easily identify trends in User behavior based on displayed VR/AR-specific usage statistics including a VR/AR systems information display 1604, a User height information display 1606, and a range of play area sizes display 1608.

The user interface display 1600 may enable a viewer to answer questions such as whether tall Users with small tracking spaces have shorter gameplay sessions, or how tracking spaces in Japan compare to the tracking spaces in the United States. Sliders and selection options allow further categorization of User behavior based on activity levels (for example, the speed and nature of physical body movements), as well as deduced emotional states based on interpretations of User movement.

Figure 17:
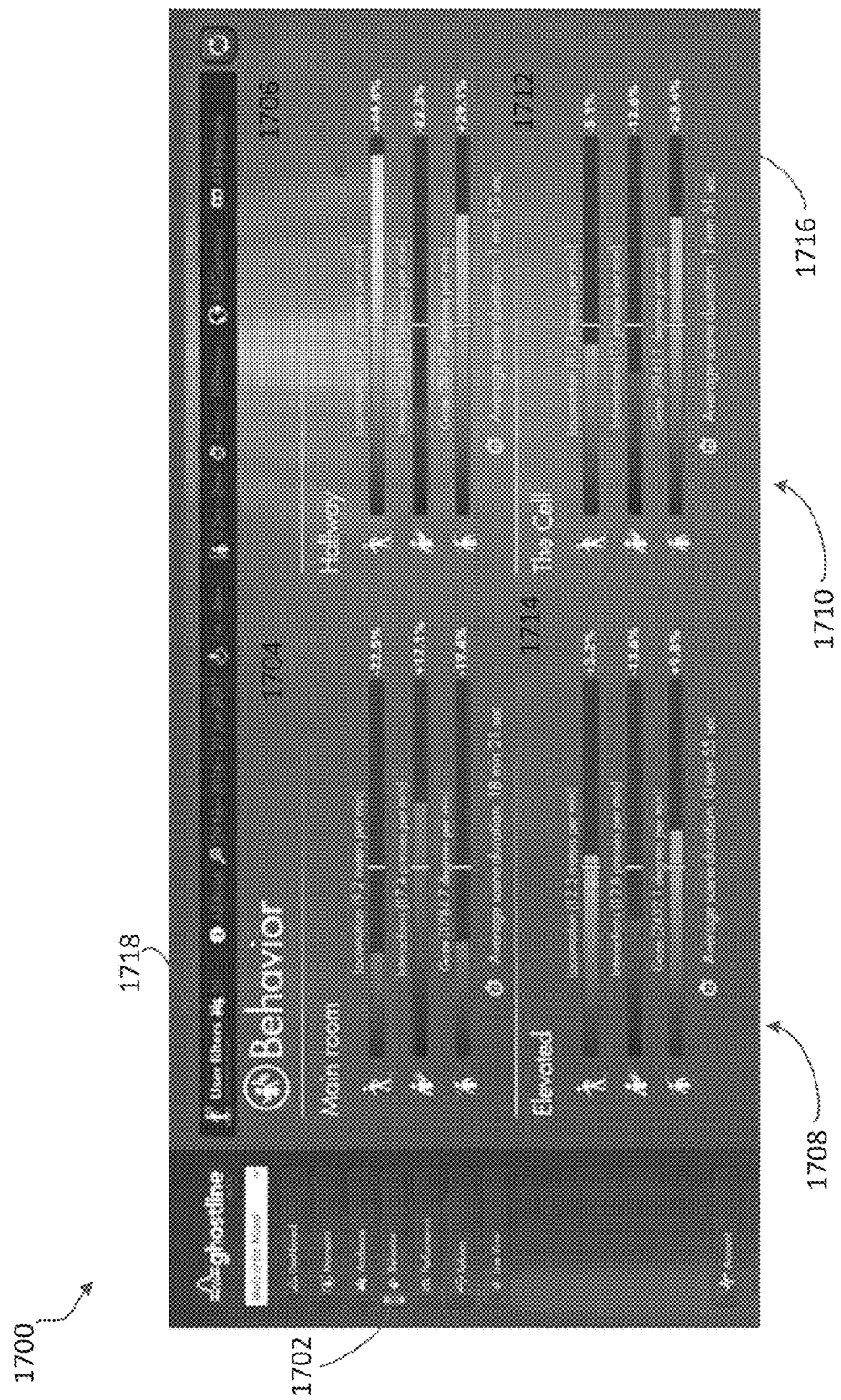
FIG. 17 illustrates a behavior user interface display according to an embodiment.

FIG. 17 illustrates a behavior user interface display 1700 according to an embodiment. In some embodiments, the behavior user interface display 1700 is displayed responsive to selection of a behavior tab 1702. The behavior user interface display 1700 provides metrics for behavioral activities in developer defined scenes. Scenes are defined by the developer and can be used to segment content into areas or time periods that the developer wants to compare. For example a videogame can be segmented into different areas such as "Intro Scene," "Boss Fight Area," or "John's Bedroom." Scenes may alternatively describe a state in the software based on time, such as "First half of the first enemy wave" and "Second half of the first enemy wave."

The behavior user interface display 1700 includes "Main room" scene information 1704, "Hallway" scene information 1706, "Elevated" scene information 1708, and "The Cell" scene information 1710. For each scene, bar charts represent the average User activity levels in a particular scene compared to other scenes, allowing a viewer to benchmark and verify differences in User behavior depending on which Scene the User was in. For example, "The Cell" scene information 1710 includes a locomotion bar chart 1712, an interactions bar chart 1714, and a gaze bar chart 1716. The "Main room" scene information 1704, the "Hallway" scene information 1706, and the "Elevated" scene information 1708 may include similar bar charts.

Each bar chart may be benchmarked against scenes that an Industry Professional has manually defined in software so that a white center line overlaid on the bar chart indicates average User activity for all scenes. The bar may represent how physical behavior exhibits itself in a particular scene and how the physical behavior performs compared to the average behavior in all scenes. User Filters 1718 can be applied to discover and verify factors that impact behavior. For instance, substandard interactivity levels for Users of short physical height may indicate that a scene design is problematic for a User group of small physical stature.

As discussed above, metrics may include Locomotion (physical movement), Interactions (button presses) and Gaze Behavior (degrees of observation) for each scene. The colored bars represent the activity levels for each scene and the white centerline overlaid on each bar represents the average User activity level across all scenes for benchmarking.

Figure 18:
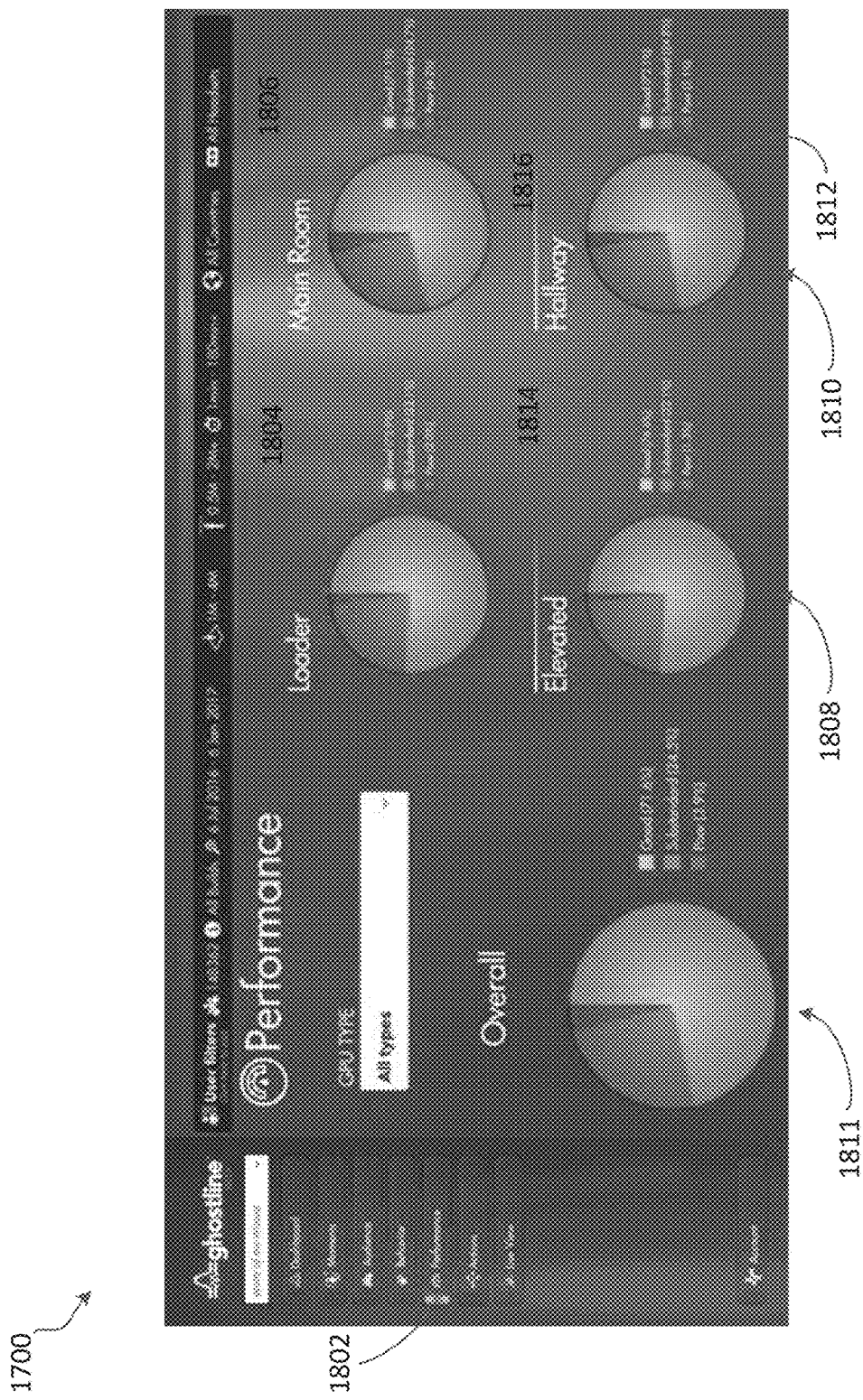
FIG. 18 illustrates a performance user interface display according to an embodiment.

FIG. 18 illustrates a performance user interface display 1800 according to an embodiment. In some embodiments, the performance user interface display 1800 is displayed responsive to selection of a performance tab 1802. The performance user interface display 1800 provides information about performance in developer-specified segments of an application, categorized by CPU/GPU type. For example, the performance user interface display 1800 may include a "Ladder" scene performance chart 1804, a "Main Room" scene performance chart 1806, an "Elevated" scene performance chart 1808, a "Hallway" scene performance chart 1810, and an "Overall" performance chart 1811.

Using the "Hallway" scene performance chart 1810 as an example, the chart 1810 may include a section indicative of good performance 1812, a section indicative of substandard performance 1814, and a section indicative of poor performance 1816. Similar information may be displayed by the "Ladder" scene performance chart 1804, the "Main Room" scene performance chart 1806, the "Elevated" scene performance chart 1808, and the "Overall" performance chart 1811. The performance user interface display 1800 may enable a viewer to dig deeper into where the worst and best performance occurs depending on User hardware.

Figure 19:
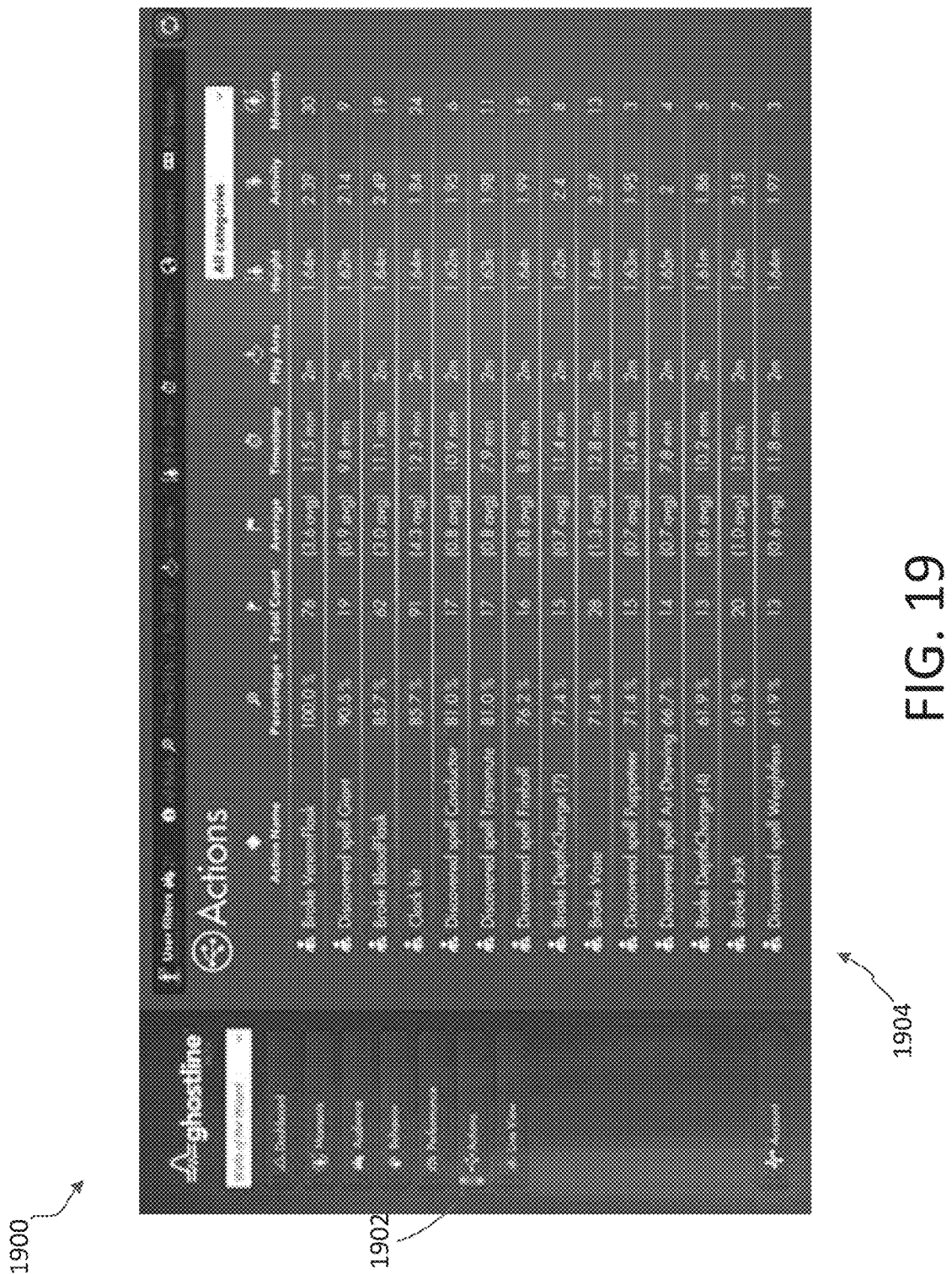
FIG. 19 illustrates an actions user interface display according to an embodiment.

FIG. 19 illustrates an actions user interface display 1900 according to an embodiment. In some embodiments, the actions user interface display 1900 is displayed responsive to selection of an actions tab 1902. The actions user interface display 1900 displays a list of actions 1904, which may include developer- or content creator-defined actions that Users perform. These can be actions such as opening a software menu, accessing an in-game inventory system, entering a certain area of a game or any software actions that content creators want to study. The purpose of actions is to provide an overview of whether there are relationships between behavioral metrics (or VR/AR hardware/software setups) and the actions that Users perform.

Figure 20:
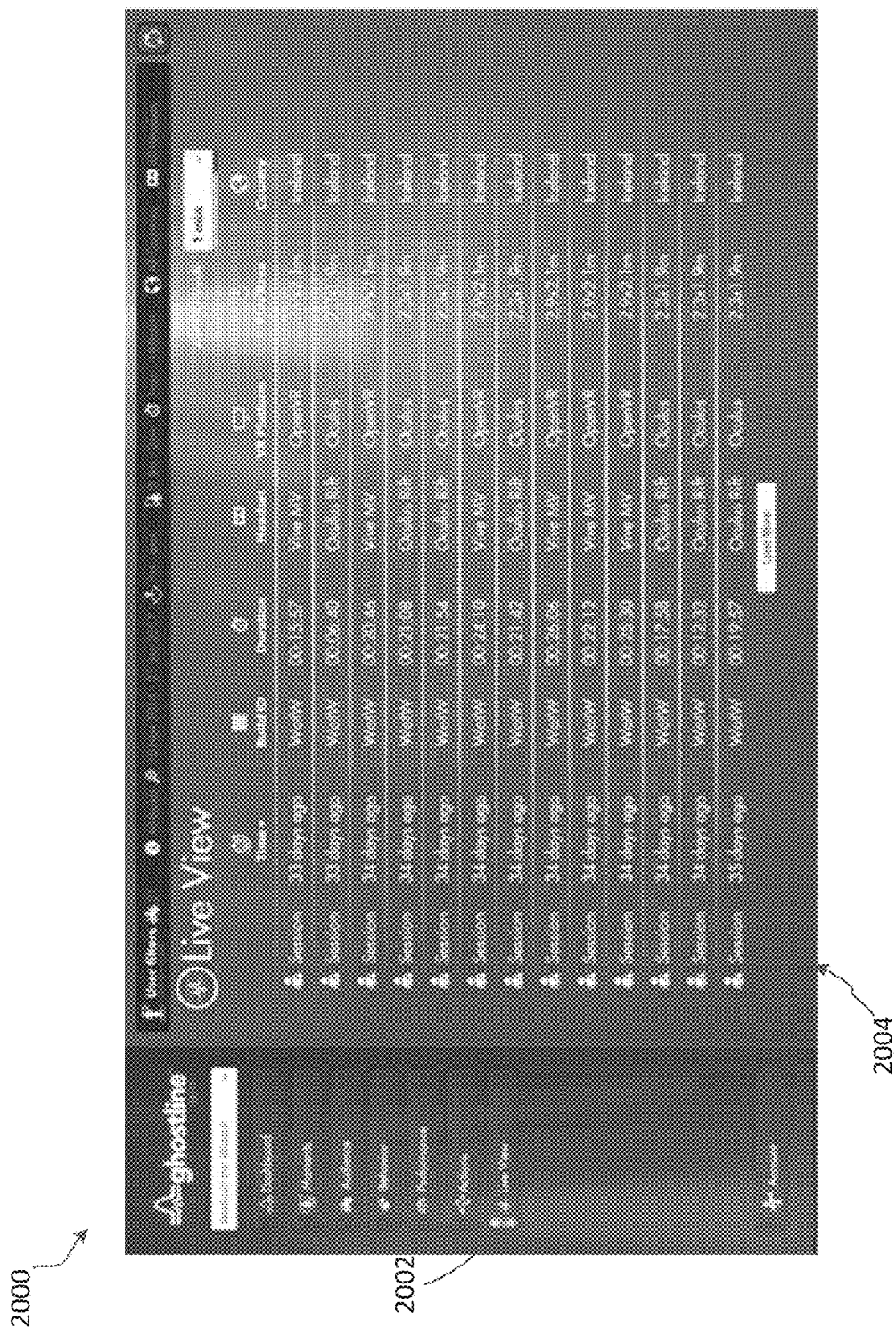
FIG. 20 illustrates a live view user interface display according to an embodiment.

FIG. 20 illustrates a live view user interface display 2000 according to an embodiment. In some embodiments, the live view user interface display 2000 is displayed responsive to selection of a live view tab 2002. The live view user interface display 2000 provides Industry Professionals with live notifications of User sessions as they are completed. Accordingly, if a User has just finished using VR/AR software somewhere in the world, a new entry will appear in a session list 2004. A basic entry in the session list 2004 provides overview information of the session and VR/AR setup of the User. Responsive to an Industry Professional clicking an entry from the session list 2004, a session information display may be provided.

Figure 21:
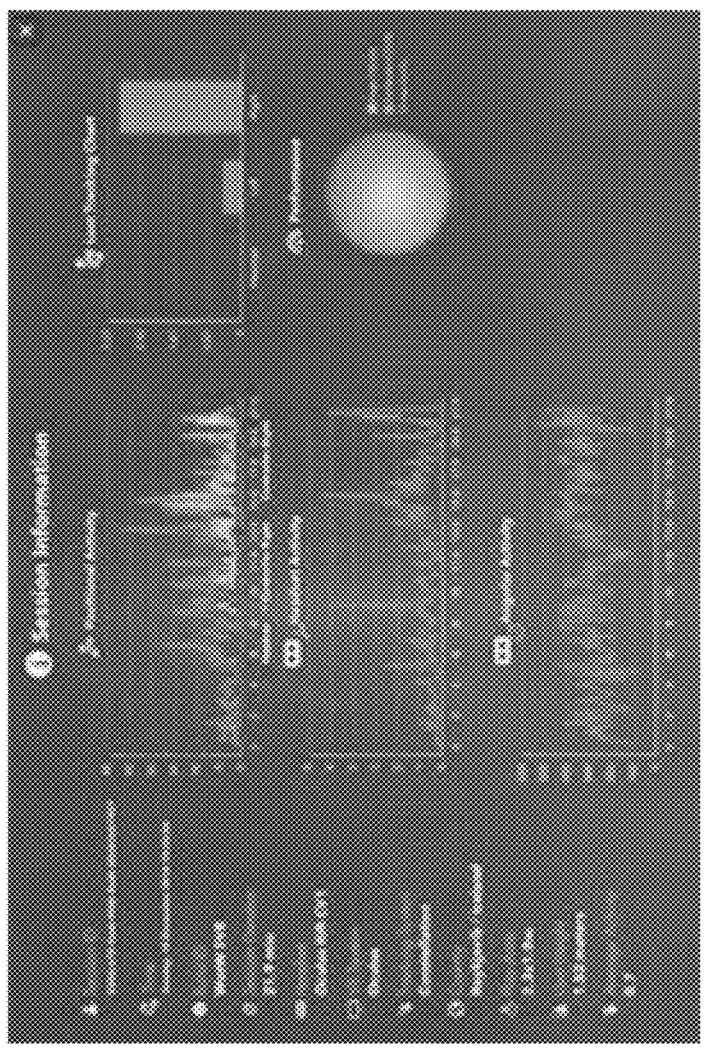
FIG. 21 illustrates a session information user interface display according to an embodiment.

FIG. 21 illustrates a session information user interface display 2100 according to an embodiment which may be displayed responsive to selection of an entry from the session list 2004. The session information user interface display 2100 provides additional session summaries showing more detailed information about a selected session. For example, if this particular User performed actions or had recorded moments, they are displayed in the session information user interface display 2100. By clicking on them, an Industry Professional may be taken to the moment user interface display 1300 or the action user interface display 1900, seeing a list of only the moments or actions associated with this particular session. This makes review of individual Users sessions more easily browsable.

Figure 22:
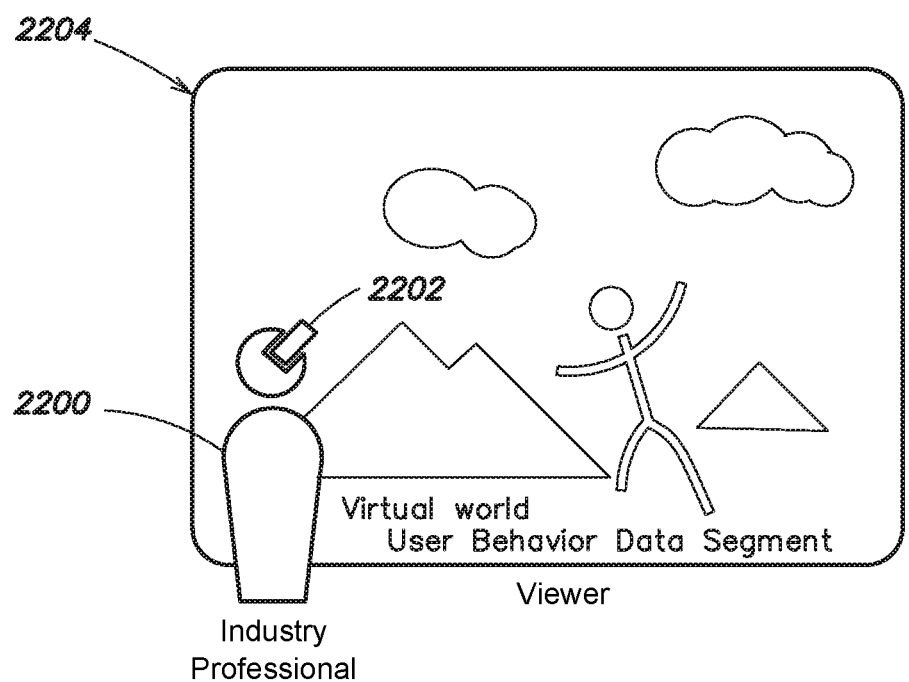
FIG. 22 illustrates a schematic diagram of a VR/AR viewing session according to an embodiment.

In some embodiments, an Industry Professional may be able to step into session recordings in virtual reality. For example, with reference to FIG. 22, an Industry Professional 2200 who is studying User behavior can put on a headset 2202 to view User recordings within representations of the environment that they were experiencing. This works similarly to viewing User recordings on a 2D screen, represented by the viewing screen 2204, except the Industry Professional feels like he is standing next to the Users he is studying within the recording itself.

Figure 23:
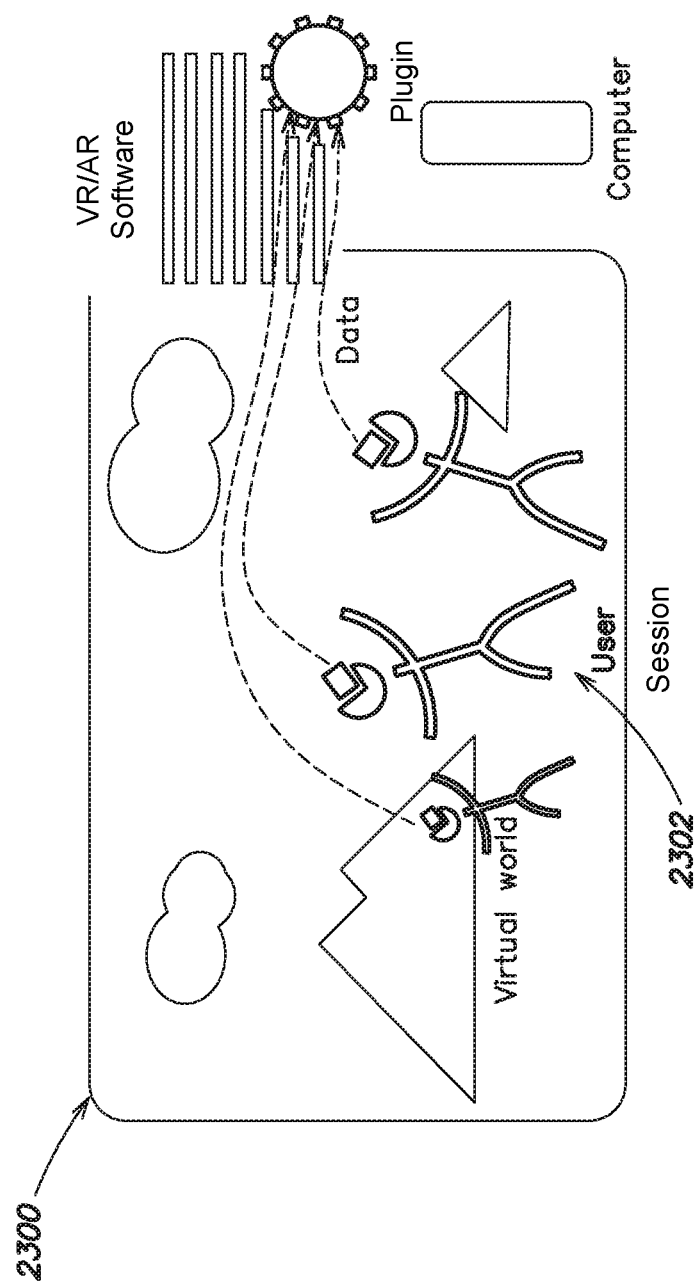
FIG. 23 illustrates a schematic diagram of a virtual world with a plurality of users according to an embodiment.

In some embodiments, an addition is provided that enables more than a single User being visualized in the same targeted Behavior Data Segment. This will enable studying how Users behave in multiplayer content, so that if a Behavior Data Segment is captured for a User A, then Behavior Data for Users B and C will also be included in the Behavior Data Segment of User A. For example, FIG. 23 illustrates a virtual world 2300 with a plurality of users 2302 according to an embodiment.

In some embodiments, collecting audio recordings from VR/AR headset microphones may be implemented while visualizing segments of data, so that an Industry Professional can hear the User speak along with environmental audio from the VR/AR content that the User was experiencing.

Figure 24:
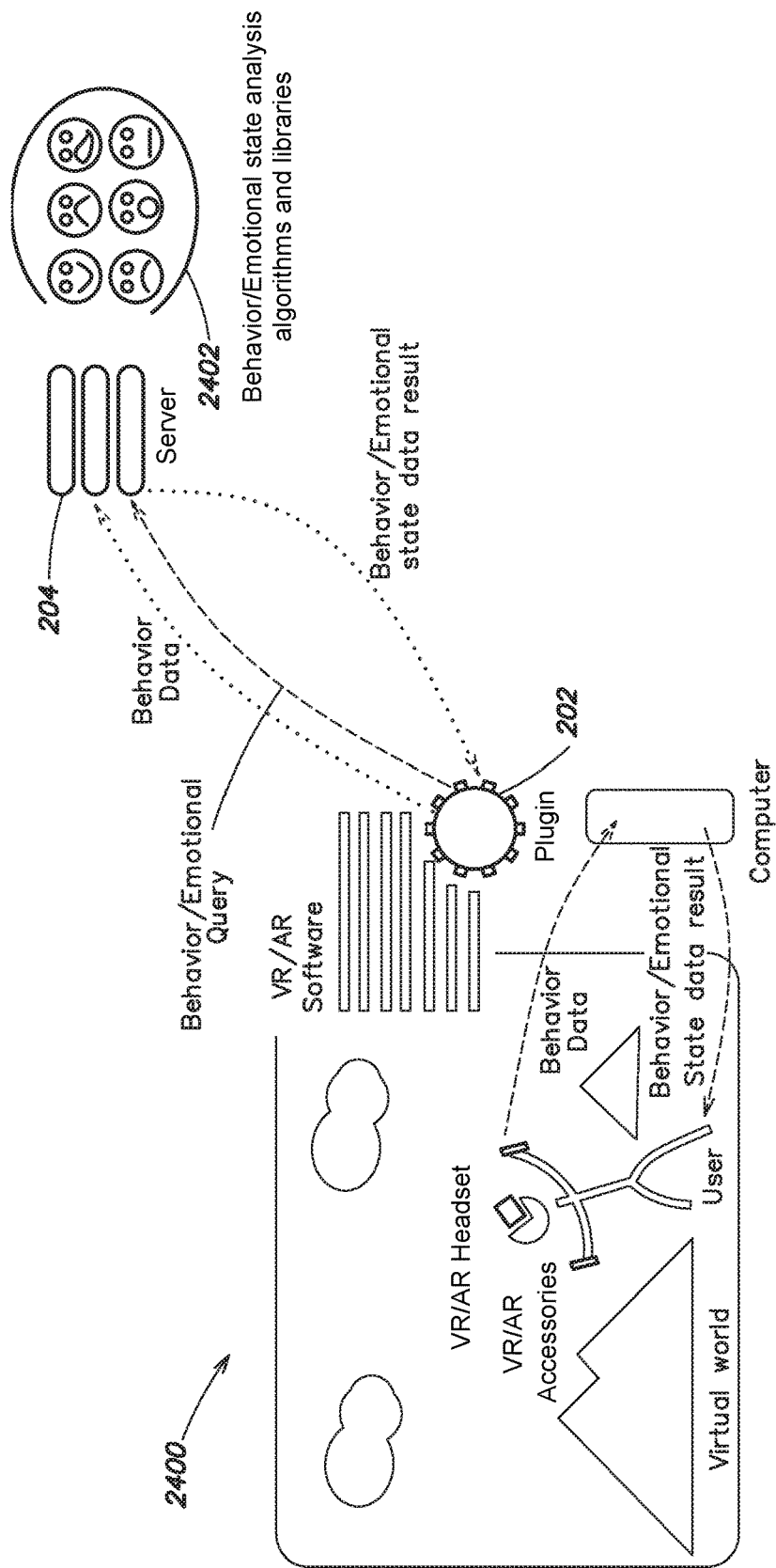
FIG. 24 illustrates a system for determining an emotional state of a user according to an embodiment.

FIG. 24 illustrates a system 2400 for determining an emotional state of a user. In some embodiments, content may be enabled to query the software plugin 202 in real-time for insights into the physical behavior of Users and what emotional state they may be based on their movements. With simple code-calls and search queries that happen at run-time of VR/AR software, information 2402 may be returned indicating how and how much Users are moving, and make inferences on the emotional state, including but not limited to states such as: excited, bored, agitated, frightened, happiness, sadness, anger, fear, surprise, and disgust.

Behavior Data Segments may be received and analyzed by the server 204, and an assessment of the current state of Users (or the state of Users in the time leading up to when the query is made) may be returned to, for example, an Industry Professional. The returned response may be a discrete term describing the user state (e.g. "Bored") and may be coupled with variables describing the level of intensity. The server 204 may also return variables describing the system's confidence in the reliability of the returned response. The SDK will in some cases have built-in functionality locally included in the software plugin 202 that enables answering simple queries, such as the activity level of Users.

For more advanced queries, such as recognition of gestures (e.g. hand waving) or the determination of emotional states, the SDK may contain advanced processing techniques and systems such as machine learning libraries capable of interpreting body language—or alternatively is able to forward the request to a server where advanced processing is carried out, returning a response to the software once processing is complete.

In a first example, suppose that VR/AR software integrated with the software plugin 202 has a character that is programmed to respond to the User in a certain manner depending on the User's level of excitement. When the virtual character needs to know how excited the User is, the software queries the software plugin 202, receiving a variable describing how excited the User is. The character is then able to respond appropriately.

In a second example, suppose that VR/AR software integrated with the software plugin 202 has in-app purchasing options that should be displayed when users are calm and showing signs of happiness. The software queries the software plugin 202 for the emotional state of users and determines whether an in-app purchase should be offered based on the reply.

Figure 25:
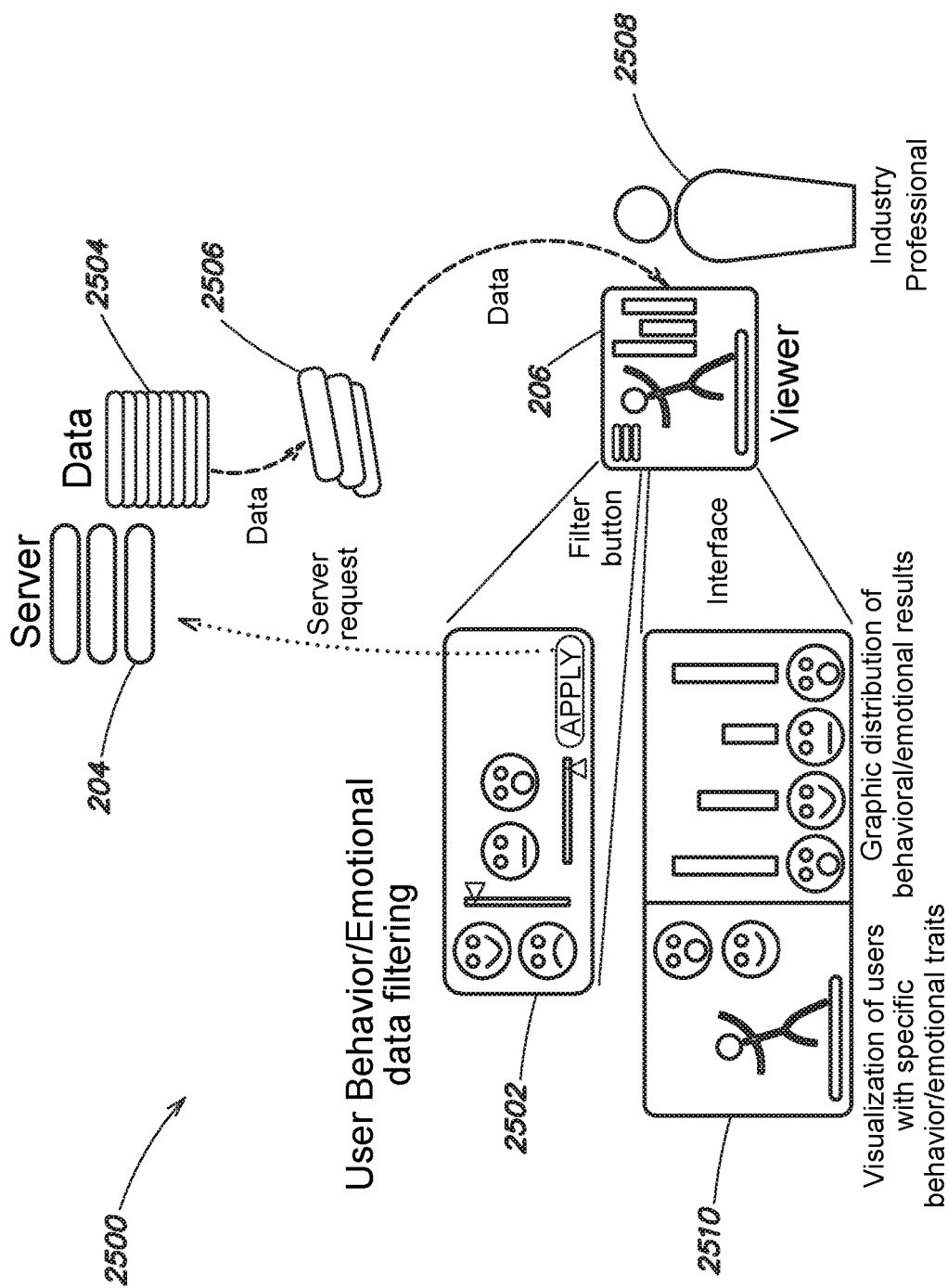
FIG. 25 illustrates a schematic diagram of filtering by emotional data according to an embodiment.

The system 2400 for emotional analysis and body-language analysis will also enable filtering of data based on the emotional states of Users and their physical behavior in the viewer application 206. For example, FIG. 25 illustrates a schematic diagram 2500 of filtering by emotional data according to an embodiment. The schematic diagram 2500 includes a filtering tool 2502 to enable Industry Professionals to filter and browse Behavior Data 2504 stored on the server 204 based on emotions of Users and physical behavior such as communicative gestures or body language expression.

A data subset 2506 corresponding to a query from an Industry Professional 2508 is returned to the Industry Professional 2508, and displayed as a visualization 2510 enabled by the viewer application 206. Industry Professionals may need to better understand what actions physically active Users perform compared to those that show more passive behavior, or seek to view Behavior Data visualizations only for Users that expressed "surprise" in their body language at a particular point in time.

Figure 26:
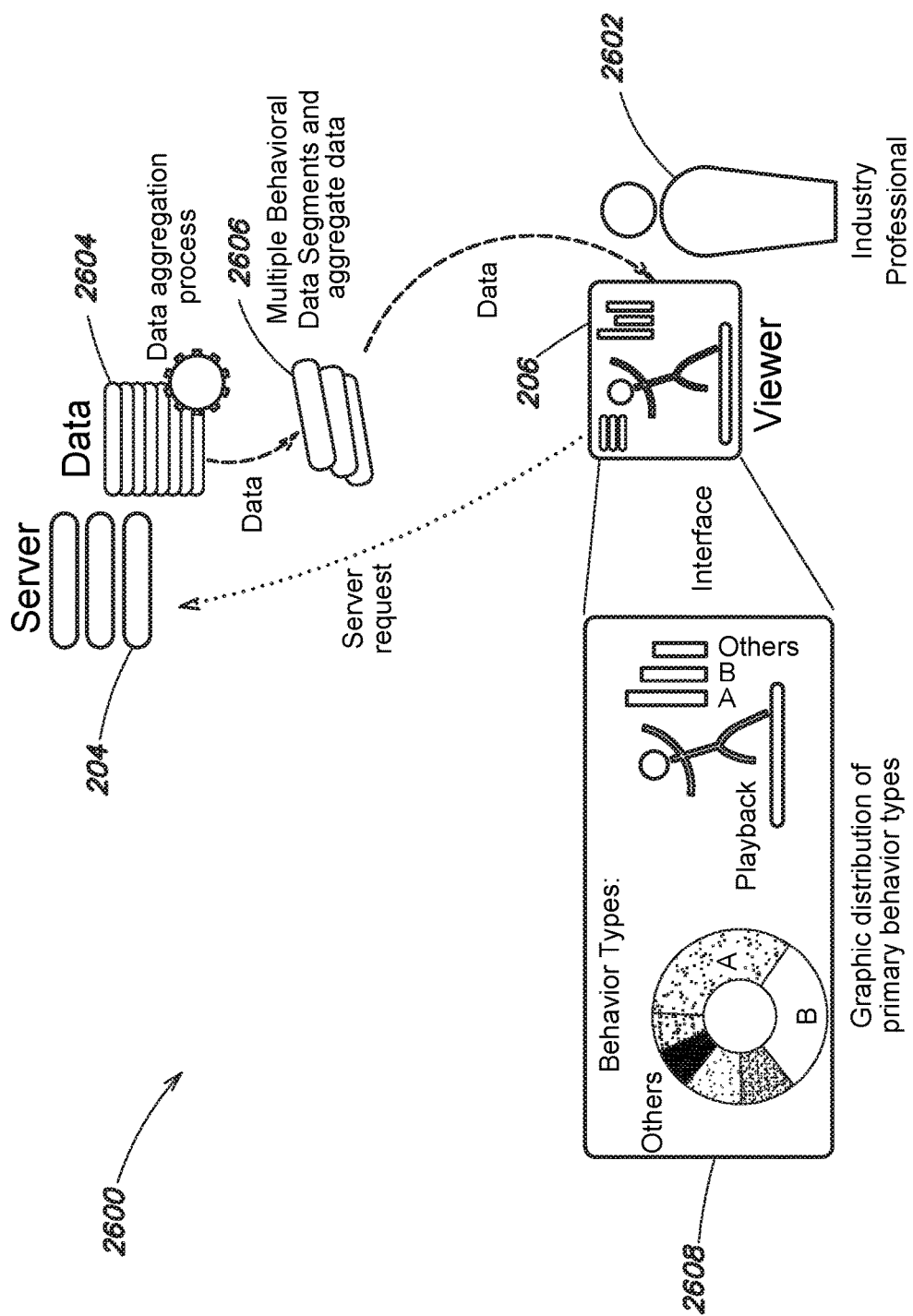
FIG. 26 illustrates a schematic diagram of filtering by actions and physical movement according to an embodiment.

For Behavior Data Segments, the software plugin 202 can allow comparison of overall user behavior and produce metrics that describe the actions and physical movement of all or group of users. This enables Industry Professionals to quickly view metrics and visualizations that summarize how the majorities of users are behaving within a particular Behavior Data Segment. For example, FIG. 26 illustrates a schematic diagram 2600 of filtering by actions and physical movement according to an embodiment. An industry professional 2602 may query the server 204, and the server 204 may search stored data 2604 to identify and return a data subset 2606 applicable to the query. The viewer application 206 may then provide an aggregate data visualization 2608.

The data subset 2606 may include aggregate data which describes the physical movements and emotions of Users, either through statistics such as activity level, button press input and interaction statistics with the environment, or by applying advanced techniques and systems such as machine learning to detect physical gestures and draw inferences on the emotional state of users. Statistical techniques may also utilize behavior data metrics to compare the behavior of users in order to statistically showcase how diverse user behavior is in a Behavior Data Segment, i.e. whether users are all showing similar physical behavior and performing similar actions, or whether they all behave differently and perform diverse actions.

Aggregate data may be summarized in the form of statistics and graphs on a visualization page 2608 enabled by the viewer application 206, or be visualized within the behavior user interface display 1700 wherein statistics and visual markers are overlaid onto the User's environment and contextual labels. The visualization may also include heat maps or visual markers to indicate where and how users physically walk around, how their head moves and rotates, or how users interact within their physical space (play areas) and virtual environments in a particular Behavior Data Segment.

Figure 27:
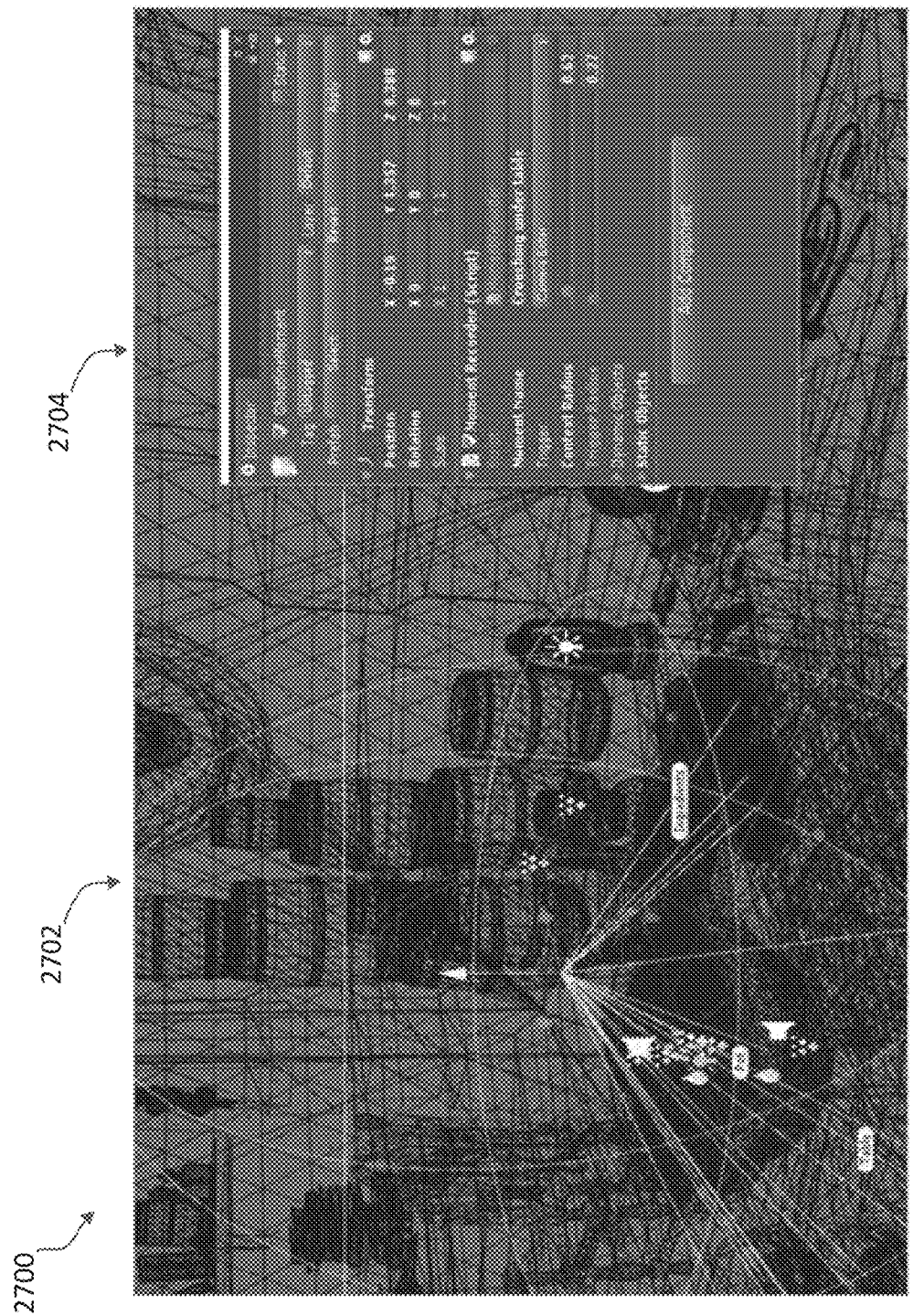
FIG. 27 illustrates a display of a 3D environment according to an embodiment.
Figure 28:
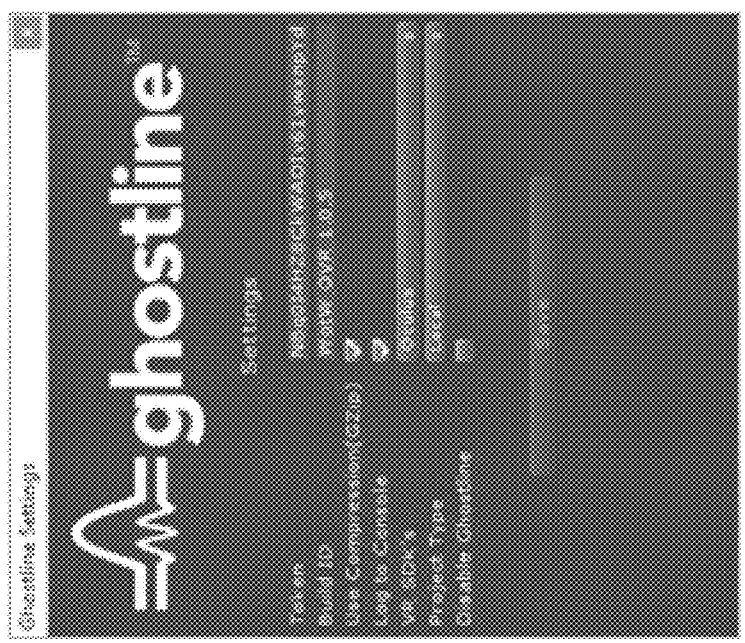
FIG. 28 illustrates a display of a settings tab according to an embodiment.

FIG. 27A illustrates a display 2700 of a 3D environment according to an embodiment. The display 2700 generally includes a viewing area 2702 and an inspector tab 2704. The inspector tab 2704 provides one or more configurable settings which may describe one or more parameters of the 3D environment displayed in the viewing area 2702, such as by enabling moment parameters to be altered. FIG. 28 illustrates a settings tab 2800 which enables configuration of various settings including, for example, setting a token value, specifying a build ID, and so forth.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A method of analyzing users in a Virtual Reality (VR) or Augmented Reality (AR) environment, the method comprising:
   receiving a data stream including information indicative of one or more user actions performed by a user in a simulated environment;
   analyzing the data stream to determine whether a first condition is satisfied;
   capturing, responsive to determining that the first condition is satisfied, first user behavior data including at least a portion of the information indicative of the one or more user actions;
   receiving a request for user behavior data satisfying the first condition;
   extracting, from the user behavior data, a plurality of user behavior data segments;
   transmitting, responsive to receiving the request, the plurality of user behavior data segments; and
   displaying a visualization of the plurality of user behavior data segments.

2. The method of claim 1, further comprising filtering the plurality of user behavior data segments based on one or more of physical characteristics, physical behavior, emotional characteristics, and VR or AR hardware characteristics.

3. The method of claim 2, wherein the physical characteristics include at least one of body language, gestures, height, stature, reach, and handedness.

4. The method of claim 2, wherein the emotional characteristics are determined based on user body language.

5. The method of claim 4, wherein the emotional characteristics include at least one of excitement, boredom, agitation, fright, happiness, sadness, anger, fear, surprise, and disgust.

6. The method of claim 2, wherein the physical behavior is indicative of actions by users or physical movement of users.

7. The method of claim 6, wherein the physical behavior of users is determined based on one or more of a user activity level, a button selection frequency, and an environment interaction frequency.

8. The method of claim 1, wherein each user behavior data segment of the plurality of user behavior data segments corresponds to a respective user of a plurality of users, and wherein displaying the visualization of the plurality of user behavior data segments includes concurrently displaying a respective visualization of physical movement of all or a subset of the plurality of users.

9. The method of claim 1, wherein each behavior data segment of the plurality of behavior data segments includes at least one label indicative of a property of an object in the behavior data segment.

10. The method of claim 9, wherein the property of the object includes at least one of a timestamped position and a timestamped orientation of the object.

11. A system for analyzing users in a Virtual Reality (VR) or Augmented Reality (AR) environment, the system comprising:
   a first computing device configured to:
      receive a data stream including information indicative of one or more user actions performed by a user in a simulated environment;
      analyze the data stream to determine whether a first condition is satisfied;

capture, responsive to determining that the first condition is satisfied, first user behavior data including at least a portion of the information indicative of the one or more user actions;

receive a request for user behavior data satisfying the first condition;

extract a plurality of user behavior data segments from the user behavior data; and transmit, responsive to receiving the request, the plurality of user behavior data segments including the first user behavior data; and a second computing device configured to:

receive the plurality of user behavior data segments; and display a visualization of the plurality of user behavior data segments.

12. The system of claim 11, wherein the second computing device is further configured to filter the plurality of user behavior data segments based on one or more of physical characteristics, physical behavior, emotional characteristics, and VR or AR hardware characteristics.

13. The system of claim 12, wherein the physical characteristics include at least one of body language, gestures, height, stature, reach, and handedness.

14. The system of claim 12, wherein the emotional characteristics are determined based on user body language.

15. The system of claim 14, wherein the emotional characteristics include at least one of excitement, boredom, agitation, fright, happiness, sadness, anger, fear, surprise, and disgust.

16. The system of claim 12, wherein the physical behavior is indicative of actions by users or physical movement of users.

17. The system of claim 16, wherein the physical behavior of users is determined based on one or more of a user activity level, a button selection frequency, and an environment interaction frequency.

18. The system of claim 11, wherein each user behavior data segment of the plurality of user behavior data segments corresponds to a respective user of a plurality of users, and wherein displaying the visualization of the plurality of user behavior data segments includes concurrently displaying a respective visualization of physical movement of all or a subset of the plurality of users.

19. The system of claim 11, wherein each behavior data segment of the plurality of behavior data segments includes at least one label indicative of a property of an object in the behavior data segment.

20. A non-transitory computer-readable medium storing sequences of computer-executable instructions for analyzing users in a Virtual Reality (VR) or Augmented Reality (AR) environment, the sequences of computer-executable instructions including instructions that instruct at least one processor to:

receive a data stream including information indicative of one or more user actions performed by a user in a simulated environment;

analyze the data stream to determine whether a first condition is satisfied;

capture, responsive to determining that the first condition is satisfied, first user behavior data including at least a portion of the information indicative of the one or more user actions;

receive a request for user behavior data satisfying the first condition;

extract a plurality of user behavior data segments from the user behavior data; and transmit, responsive to receiving the request, the plurality of user behavior data segments including the first user behavior data.

* * * * *